United States Patent
Huang et al.

(10) Patent No.: US 12,314,343 B2
(45) Date of Patent: May 27, 2025

(54) IMAGE CLASSIFICATION METHOD, NEURAL NETWORK TRAINING METHOD, AND APPARATUS

(71) Applicants: Huawei Technologies Co., Ltd., Shenzhen (CN); PEKING UNIVERSITY, Beijing (CN)

(72) Inventors: Weiran Huang, Beijing (CN); Aoxue Li, Beijing (CN); Zhenguo Li, Hong Kong (CN); Tiange Luo, Beijing (CN); Li Qian, Shenzhen (CN); Liwei Wang, Beijing (CN)

(73) Assignees: Huawei Technologies Co., Ltd., Shenzhen (CN); Peking University, Beijing (CN)

( * ) Notice: Subject to any disclaimer, the term of this patent is extended or adjusted under 35 U.S.C. 154(b) by 755 days.

(21) Appl. No.: 17/538,640

(22) Filed: Nov. 30, 2021

(65) Prior Publication Data
US 2022/0092351 A1    Mar. 24, 2022

Related U.S. Application Data

(63) Continuation of application No. PCT/CN2020/075896, filed on Feb. 19, 2020.

(30) Foreign Application Priority Data

May 30, 2019    (CN) .......................... 201910464523.4

(51) Int. Cl.
*G06F 18/214* (2023.01)
*G06F 18/24* (2023.01)
(Continued)

(52) U.S. Cl.
CPC ............ *G06F 18/214* (2023.01); *G06F 18/24* (2023.01); *G06N 3/08* (2013.01); *G06V 10/40* (2022.01); *G06V 10/95* (2022.01)

(58) Field of Classification Search
CPC .... G06F 18/214; G06F 18/24; G06F 18/2321; G06F 18/2411; G06N 3/08; G06N 3/044;
(Continued)

(56) References Cited

U.S. PATENT DOCUMENTS 10,635,979 B2 *  4/2020  Hickson ................. G06N 3/088
10,885,395 B2 *  1/2021  Iventosch ............ G06Q 10/087
(Continued)

FOREIGN PATENT DOCUMENTS

CN    106886795 A    6/2017
CN    108647702 A    10/2018
(Continued)

OTHER PUBLICATIONS

Kodirov et al., "Semantic Autoencoder for Zero-Shot Learning," 2017 IEEE Conference on Computer Vision and Pattern Recognition, pp. 3174-3183, Honolulu, HI, USA (Jul. 2017).

*Primary Examiner* — Mia M Thomas
(74) *Attorney, Agent, or Firm* — Leydig, Voit & Mayer, Ltd.

(57) ABSTRACT

An image classification method, a neural network training method, and an apparatus are provided, and relate to the field of artificial intelligence, and specifically, to the field of computer vision. The image classification method includes: obtaining a to-be-processed image; and obtaining a classification result of the to-be-processed image based on a pre-trained neural network model, where the classification result includes a class or a superclass to which the to-be-processed image belongs. When the neural network model is trained, not only labels of a plurality of training images but also class hierarchy information of the plurality of training images is used. That is, more abundant information of the training images is used. Therefore, images can be better classified.

18 Claims, 11 Drawing Sheets

(51) Int. Cl.
  *G06N 3/08* (2023.01)
  *G06V 10/40* (2022.01)
  *G06V 10/94* (2022.01)

(58) Field of Classification Search
  CPC ........ G06N 3/045; G06N 3/048; G06V 10/40; G06V 10/95; G06V 10/82
  See application file for complete search history.

(56) References Cited

U.S. PATENT DOCUMENTS

| | | | | |
|---|---|---|---|---|
| 11,455,792 | B2* | 9/2022 | Maeng | B60Q 1/507 |
| 2017/0140253 | A1 | 5/2017 | Wshah et al. | |
| 2017/0330059 | A1* | 11/2017 | Novotny | G06V 10/7515 |
| 2018/0218351 | A1* | 8/2018 | Chaubard | G07G 1/0081 |
| 2019/0332694 | A1* | 10/2019 | Tcherechansky | G06F 16/5866 |
| 2019/0385009 | A1* | 12/2019 | Iventosch | G06V 20/10 |
| 2019/0385106 | A1* | 12/2019 | Iventosch | G06V 10/454 |
| 2020/0027002 | A1* | 1/2020 | Hickson | G06N 3/088 |
| 2021/0150346 | A1* | 5/2021 | Bertinetto | G06N 20/00 |
| 2022/0207920 | A1* | 6/2022 | Cho | G06V 40/23 |
| 2022/0415029 | A1* | 12/2022 | Iventosch | G06V 10/26 |
| 2023/0023434 | A1* | 1/2023 | Nowicka | G06V 20/00 |
| 2023/0087526 | A1* | 3/2023 | Huang | G06V 20/30 382/156 |
| 2023/0140893 | A1* | 5/2023 | Kim | G06T 9/00 382/224 |
| 2023/0316715 | A1* | 10/2023 | Kumar | G06N 3/084 382/181 |
| 2024/0104180 | A1* | 3/2024 | S | G06F 21/32 |

FOREIGN PATENT DOCUMENTS

| | | |
|---|---|---|
| CN | 109002845 A | 12/2018 |
| CN | 109196514 A | 1/2019 |
| CN | 109685110 A | 4/2019 |
| CN | 109816092 A | 5/2019 |
| CN | 110309856 A | 10/2019 |

\* cited by examiner

IMAGE CLASSIFICATION METHOD, NEURAL NETWORK TRAINING METHOD, AND APPARATUS

CROSS-REFERENCE TO RELATED APPLICATIONS

This application is a continuation of International Application No. PCT/CN2020/075896, filed on Feb. 19, 2020, which claims priority to Chinese Patent Application No. 201910464523.4, filed on May 30, 2019. The disclosures of the aforementioned applications are hereby incorporated by reference in their entireties.

TECHNICAL FIELD

This application relates to the field of artificial intelligence, and more specifically, to an image classification method, a neural network training method, and an apparatus.

BACKGROUND

Computer vision is an integral part of various intelligent/autonomous systems in various application fields such as manufacturing, inspection, document analysis, medical diagnosis, and military, and is knowledge about how to use a camera/video camera and a computer to obtain required data and information of a photographed object. Figuratively, the computer is equipped with eyes (cameras/video cameras) and a brain (algorithm) to take the place of human eyes to perform recognition, tracing, measurement, and the like on a target, so that the computer can sense an environment. Because sensing may be considered as extracting information from a sensory signal, computer vision may also be considered as a scientific field of how to enable an artificial system to "sense" an image or multidimensional data. In general, computer vision is to use various imaging systems instead of visual organs to obtain input information, and then use the computer instead of the brain to process and interpret the input information. An ultimate research goal of computer vision is to enable the computer to observe and understand the world through vision like a human being, and have a capability to adapt to the environment autonomously.

Computer vision usually relates to a problem of how to classify obtained images or pictures. Image classification has been more widely used. Therefore, how to better classify images is a problem to be resolved.

SUMMARY

This application provides an image classification method, a neural network training method, and an apparatus, to better perform image classification.

According to a first aspect, an image classification method is provided. The method includes: obtaining a to-be-processed image; and classifying the to-be-processed image based on a preset neural network model, to obtain a classification result of the to-be-processed image.

The classification result of the to-be-processed image includes a class or a superclass to which the to-be-processed image belongs. The neural network model is obtained by performing training based on a plurality of training images, a label of each of the plurality of training images, and class hierarchy information of the plurality of training images. The class hierarchy information of the plurality of training images includes at least one superclass to which each of a plurality of classes belongs. The plurality of classes include a class to which each of the plurality of training images belongs.

It should be understood that the class hierarchy information of the plurality of training images includes not only the class to which each of the plurality of training images belongs, but also at least one superclass to which each of the plurality of training images belongs. The at least one superclass to which each training image belongs is at least one superclass to which a class (the class to which each training image belongs) of each training image belongs.

The label of each training image includes the class to which each training image belongs.

The class to which each image belongs may be understood as a general classification of the image, may be considered as a relatively basic classification of the image, and is a class to which an object in the image belongs. Generally, a finer classification is not performed on the image on the basis of the classification. The superclass to which the class of the image belongs is equivalent to a parent class of the class to which the object in the image belongs, and the superclass is a higher-level classification above the class. The superclass may be equivalent to the parent class. Generally, classes of images with some common characteristics may be classified into a superclass. In addition, the superclass may also be referred to as a category.

For example, the plurality of training images include training images 1 to 4, where the training image 1 is an image of an apple, the training image 2 is an image of an orange, the training image 3 is an image of a lion, and the training image 4 is an image of a tiger. In this case, classes to which the training images 1 to 4 belong are respectively apples, oranges, lions, and tigers.

For another example, the plurality of training images also include training images 1 to 4, and classes to which the training images 1 to 4 belong are respectively apples, oranges, lions, and tigers. In this case, class hierarchy information of the training images 1 to 4 includes: Apples and oranges belong to fruits, and lions and tigers belong to animals. Based on the class hierarchy information of the training images 1 to 4, it can be learned that a superclass to which apples and oranges belong is fruits, and a superclass to which lions and tigers belong is animals.

Optionally, the at least one superclass includes superclasses of different levels, and a superclass with a higher level is also a superclass of a superclass with a lower level.

It should be understood that a class may belong to a plurality of superclasses, and these superclasses have different levels. For example, the training image 1 is an image of an apple, a class of the training image 1 is apples, and superclasses to which the class of the training image 1 belongs may include fruits and plants. Fruits may be a superclass of a first level, and plants may be a superclass of a second level. The superclass of the second level may also be considered as a superclass of the superclass of the first level.

In this application, when the neural network model is trained, not only labels of the plurality of training images but also the class hierarchy information of the plurality of training images is used. That is, when the neural network model used in this application is trained, not only classes to which the plurality of training images belong but also superclasses to which the plurality of training images belong are considered. Therefore, a better classification result can be obtained when the neural network model obtained through training in this training manner is used to classify the to-be-processed image.

Specifically, when the neural network model is trained, more abundant information (the labels of the plurality of training images and the class hierarchy information of the plurality of training images) is used. Therefore, a more accurate neural network model can be obtained through training, and it is more likely to obtain a better classification result when an image is classified based on the neural network model.

Optionally, the plurality of training images include images in a source class.

The source class may be a large-scale training set. The source class may be analogous to human knowledge accumulation, and the images in the source class may be images of known image classes.

Optionally, the images in the source class are from an ILSVRC2012 data set. Specifically, the images in the source class may include images of 1000 classes in the ILSVRC2012 data set.

Optionally, the plurality of training images may further include images in a novel class.

The source class is generally a class with large-scale data, and the novel class is generally a class with only a few samples. For the source class, images in the source class are generally training images. Images in the novel class generally include some training images (images with labels) and some test images (images without labels).

Optionally, the images in the source class are from an ILSVRC2010 data set. Specifically, the images in the source class may include one to five images in each class of image in the ILSVRC2010 data set.

With reference to the first aspect, in some implementations of the first aspect, the at least one superclass to which each of the plurality of classes belongs is determined based on association degree information between word vectors corresponding to the labels of the plurality of training images.

The association degree information can reflect a degree of association (which may be measured by a magnitude of the association degree) between the word vectors. If word vectors corresponding to labels of several training images are closely associated, classes to which the several training images belong are relatively close, and several classes to which the several training images belong may be classified into a superclass.

The association degree information may be specifically distance information. In this case, distances between word vectors may be used to measure association degrees between different word vectors. Generally, a shorter distance between two word vectors indicates a higher association degree between the two word vectors.

Optionally, the word vectors corresponding to the labels of the plurality of training images are obtained by processing the plurality of training images by using a text model.

Optionally, the at least one superclass to which each of the plurality of classes belongs is obtained by performing clustering processing on the word vectors corresponding to the labels of the plurality of training images.

It should be understood that, in a process of performing clustering processing on the word vectors corresponding to the labels of the plurality of training images, association degrees between the word vectors corresponding to the labels of the plurality of training images are considered, word vectors with relatively high association degrees may be clustered together, and corresponding training images can also be classified into a same superclass.

Data may be aggregated into several groups through clustering processing. When clustering processing is performed, a K-Means clustering algorithm may be specifically used.

With reference to the first aspect, in some implementations of the first aspect, the at least one superclass to which each of the plurality of classes belongs is pre-labeled.

Because accuracy of manual labeling is generally higher, pre-labeling the at least one superclass to which each of the plurality of classes belongs can make labeling of the superclass more accurate, so that obtained class hierarchy information is also more accurate.

With reference to the first aspect, in some implementations of the first aspect, the classifying the to-be-processed image based on a preset neural network model, to obtain a classification result of the to-be-processed image includes: extracting a feature vector of the to-be-processed image; determining, based on the feature vector of the to-be-processed image, confidence that the to-be-processed image belongs to each of a plurality of candidate classes; and determining the classification result of the to-be-processed image from the plurality of candidate classes based on the confidence that the to-be-processed image belongs to each of the plurality of candidate classes.

It should be understood that the feature vector of the to-be-processed image may be obtained by performing convolution processing on the to-be-processed image by using a convolutional layer in a neural network.

The confidence that the to-be-processed image belongs to each of the plurality of candidate classes may specifically refer to a probability that the to-be-processed image belongs to each of the plurality of candidate classes.

The plurality of candidate classes may be all candidate classes included in the neural network model. In this case, confidence that the to-be-processed image belongs to each of all the candidate classes needs to be determined.

In addition, the plurality of candidate classes may alternatively be candidate classes whose corresponding confidence is greater than a specific preset value in all candidate classes. In this case, the class to which the to-be-processed image belongs needs to be determined only from the candidate classes whose corresponding confidence is relatively high, and the class to which the to-be-processed image belongs does not need to be determined from all the candidate classes.

For example, the plurality of candidate classes may be candidate classes whose corresponding confidence is greater than 3% in all candidate classes. In this case, the class to which the to-be-processed image finally belongs may be determined from the candidate classes whose corresponding confidence is greater than 3%.

It should be understood that 3% may be considered as a confidence threshold, and a value of 3% is merely a specific example. In actual application, a specific value of the confidence threshold may be flexibly set based on a specific situation.

When the classification result of the to-be-processed image is determined from the plurality of candidate classes based on the confidence that the to-be-processed image belongs to each of the plurality of candidate classes, a candidate class corresponding to highest confidence may be determined as the classification result of the to-be-processed image.

For example, the plurality of candidate classes include apples, oranges, and bananas, and confidence that the to-be-processed image belongs to apples, oranges, and bananas is 20%, 30%, and 50%, respectively. Confidence that the to-be-processed image belongs to bananas is highest. Therefore, it can be determined that the to-be-processed image belongs to bananas. That is, the classification result of the to-be-processed image is bananas.

When the to-be-processed image is classified, image classes that can be selected may include a plurality of candidate classes and a plurality of candidate superclasses. The plurality of candidate classes herein may be a general classification of the image, and may be considered as a relatively basic classification of the image. Generally, a further classification is not performed on the image on the basis of the classification.

The superclass may be a larger classification based on the general image class. For example, the foregoing image classes may be specific classes such as apples, oranges, and pears. Because apples, oranges, and pears all belong to fruits, a corresponding superclass may be fruits. For another example, the foregoing image classes may be specific classes such as tigers, lions, and zebras. Because tigers, lions, and zebras all belong to animals, a corresponding superclass may be animals.

With reference to the first aspect, in some implementations of the first aspect, the determining the classification result of the to-be-processed image from the plurality of candidate classes based on the confidence that the to-be-processed image belongs to each of the plurality of candidate classes includes: determining a first candidate class in the plurality of candidate classes as the classification result of the to-be-processed image, where the first candidate class is a class with highest confidence in the plurality of candidate classes.

For example, the plurality of candidate classes include apples, oranges, pears, cantaloupes, and bananas, and confidence that the to-be-processed image belongs to apples, oranges, pears, cantaloupes, and bananas is 10%, 15%, 15%, 30%, and 30%, respectively. In these classes, confidence that the to-be-processed image belongs to bananas is highest. Therefore, bananas may be directly used as the classification result of the to-be-processed image.

With reference to the first aspect, in some implementations of the first aspect, the method further includes: determining a first candidate superclass in a plurality of candidate superclasses as the classification result of the to-be-processed image, where the confidence of the first candidate class is less than a first confidence threshold, and confidence of the first candidate superclass is greater than or equal to a second confidence threshold.

When the confidence of the candidate classes to which the to-be-processed image belongs is relatively low, a candidate superclass whose confidence meets a requirement may be determined as a classification of the to-be-processed image. In this way, when the image class to which the to-be-processed image belongs cannot be recognized, the superclass to which the to-be-processed image belongs can be recognized, and a corresponding recognition result can be output. Therefore, in this application, when confidence corresponding to the image class is relatively low, a recognition result can still be output, thereby implementing recognition of the to-be-processed image.

The first confidence threshold and the second confidence threshold may be preset thresholds, and specific values of the first confidence threshold and the second confidence threshold may be set based on experience or an actual requirement. Values of the first confidence threshold and the second confidence threshold may be the same or different (the first confidence threshold may be greater than the second confidence threshold, or the first confidence threshold may be less than the second confidence threshold).

For example, both the first confidence threshold and the second confidence threshold are 50%, the first candidate class is apples, confidence that the to-be-processed image belongs to apples is 40%, the first candidate superclass is fruits, and confidence that the to-be-processed image belongs to fruits is 60%. In this case, because the confidence that the to-be-processed image belongs to the class of apples is less than 50%, and the confidence that the to-be-processed image belongs to the superclass of fruits is 60%, it can be determined that the classification result of the to-be-processed image is fruits.

With reference to the first aspect, in some implementations of the first aspect, the classifying the to-be-processed image based on a preset neural network model, to obtain a classification result of the to-be-processed image includes: obtaining reference images of the to-be-processed image, where the reference images include a plurality of classes of images, and the to-be-processed image belongs to one of the plurality of classes of images; extracting a feature vector of the to-be-processed image and a feature vector of each class of image in the plurality of classes of images; determining, based on a difference between the feature vector of the to-be-processed image and the feature vector of each class of image in the plurality of classes of images, confidence that the to-be-processed image belongs to each class of image in the plurality of classes of images; and determining the classification result of the to-be-processed image from the plurality of classes of images based on the confidence that the to-be-processed image belongs to each class of image in the plurality of classes of images.

In a "few-shot learning" scenario, when the to-be-processed image is recognized, the class to which the to-be-processed image belongs may be directly selected from a plurality of classes to which the reference images belong, based on differences between the feature vector of the to-be-processed image and feature vectors of the reference images, to determine the classification result of the to-be-processed image.

Optionally, the method further includes: presenting the classification result of the to-be-processed image.

Specifically, when the method is performed by an electronic device, the classification result of the to-be-processed image may be presented in a display interface of the electronic device.

According to a second aspect, an image classification method is provided. The method includes: obtaining a to-be-processed image; and classifying the to-be-processed image based on a preset first neural network model, to obtain a classification result of the to-be-processed image.

The classification result of the to-be-processed image includes a class or a superclass to which the to-be-processed image belongs. The first neural network model is obtained by performing training based on a plurality of first feature vectors, labels of a plurality of first training images, and semantic description information of the plurality of first training images. Semantic description information of each of the plurality of first training images is a semantic description of an image feature of the first training image. The plurality of first feature vectors are feature vectors obtained by performing feature extraction on the plurality of first training images by a second neural network model.

The second neural network model is obtained by performing training based on a plurality of second training images, a label of each of the plurality of second training images, and class hierarchy information of the plurality of second training images. The class hierarchy information of the plurality of second training images includes a class to which each of the plurality of second training images belongs and at least one superclass to which each of the plurality of second training images belongs.

The second neural network model is equivalent to the neural network model in the method according to the first aspect, and class hierarchy information of a training image is also used in a process of training the second neural network model. Therefore, more accurate feature information can be extracted when the second neural network model performs feature extraction, so that a better classification result can be obtained when the image is subsequently classified based on the first neural network model.

In this application, the class hierarchy information of the training image is used during training of the second neural network model. Therefore, a more comprehensive or accurate image feature can be extracted when the second neural network subsequently performs feature extraction, so that the more comprehensive or accurate image feature is used during training of the first neural network model. Therefore, a better or more accurate classification result can be obtained when the image is classified by using the first neural network model.

With reference to the second aspect, in some implementations of the second aspect, the classifying the to-be-processed image based on a preset first neural network model includes: extracting a feature vector of the to-be-processed image based on the second neural network model; processing the feature vector of the to-be-processed image based on the first neural network model, to obtain a semantic vector of the to-be-processed image; and comparing the semantic vector of the to-be-processed image with a candidate semantic vector, to obtain the classification result of the to-be-processed image.

Optionally, the comparing the semantic vector of the to-be-processed image with a candidate semantic vector, to obtain the classification result of the to-be-processed image includes: determining an image class corresponding to a first candidate semantic vector as the classification result of the to-be-processed image, where an association degree between the first candidate semantic vector and the semantic vector of the to-be-processed image meets a preset requirement.

That the association degree between the first candidate semantic vector and the semantic vector of the to-be-processed image meets the preset requirement may specifically mean that a distance between the first candidate semantic vector and the semantic vector of the to-be-processed image is less than a preset distance.

Alternatively, that the association degree between the first candidate semantic vector and the semantic vector of the to-be-processed image meets the preset requirement may mean that a distance between the first candidate semantic vector and the semantic vector of the to-be-processed image is shortest in a plurality of candidate semantic vectors.

Optionally, the method further includes: presenting the classification result of the to-be-processed image.

Specifically, when the method is performed by an electronic device, the classification result of the to-be-processed image may be presented in a display interface of the electronic device.

According to a third aspect, a neural network training method is provided. The method includes: obtaining a plurality of training images; extracting image features of the plurality of training images based on a feature extraction network of a neural network; processing the image features of the plurality of training images based on a hierarchical prediction network of the neural network, to obtain classification results of the plurality of images, where a classification result of each of the plurality of images includes a class and a superclass to which the training image belongs; and determining a parameter of a neural network model based on the classification results of the plurality of training images and labeled classes of the plurality of training images.

In this application, when the neural network is trained, not only the class to which the training image belongs but also the superclass to which the training image belongs is used. The neural network is trained by using more comprehensive information, so that a better neural network model can be obtained. Therefore, an image can be better classified by using the neural network model, and a better or more accurate classification result can be obtained.

According to a fourth aspect, an image classification apparatus is provided. The apparatus includes modules configured to perform the method in the first aspect or the second aspect.

According to a fifth aspect, a neural network training apparatus is provided. The apparatus includes modules configured to perform the method in the third aspect.

According to a sixth aspect, an image classification apparatus is provided. The apparatus includes: a memory, configured to store a program; and a processor, configured to execute the program stored in the memory. When the program stored in the memory is executed, the processor is configured to perform the method in any one of the implementations of the first aspect or the second aspect.

According to a seventh aspect, a neural network training apparatus is provided. The apparatus includes: a memory, configured to store a program; and a processor, configured to execute the program stored in the memory. When the program stored in the memory is executed, the processor is configured to perform the method in any one of the implementations of the third aspect.

The processor in the sixth aspect and the seventh aspect may be a central processing unit (CPU), or may be a combination of a CPU and a neural network operation processing unit. The neural network operation processing unit herein may include a graphics processing unit (GPU), a neural network processing unit (NPU), a tensor processing unit (TPU), or the like. The TPU is an artificial intelligence accelerator application-specific integrated circuit fully customized by Google® for machine learning.

According to an eighth aspect, a computer-readable medium is provided. The computer-readable medium stores program code to be executed by a device, and the program code includes code used to perform the method in any one of the implementations of the first aspect to the third aspect.

According to a ninth aspect, a computer program product including instructions is provided. When the computer program product is run on a computer, the computer is enabled to perform the method in any one of the implementations of the first aspect to the third aspect.

According to a tenth aspect, a chip is provided. The chip includes a processor and a data interface, and the processor reads, through the data interface, instructions stored in a memory, to perform the method in any one of the implementations of the first aspect to the third aspect.

Optionally, in an implementation, the chip may further include a memory. The memory stores instructions, and the processor is configured to execute the instructions stored in the memory. When the instructions are executed, the processor is configured to perform the method in any one of the implementations of the first aspect to the third aspect.

The chip may be specifically a field-programmable gate array (FPGA) or an application-specific integrated circuit (ASIC).

According to an eleventh aspect, an electronic device is provided. The electronic device includes the image classification apparatus in any one of the fourth aspect, or the electronic device includes the neural network training apparatus in any one of the fifth aspect.

When the electronic device includes the image classification apparatus in any one of the fourth aspect, the electronic device may be specifically a terminal device.

When the electronic device includes the neural network training apparatus in any one of the fifth aspect, the electronic device may be specifically a server.

DESCRIPTION OF EMBODIMENTS

Figure 1:
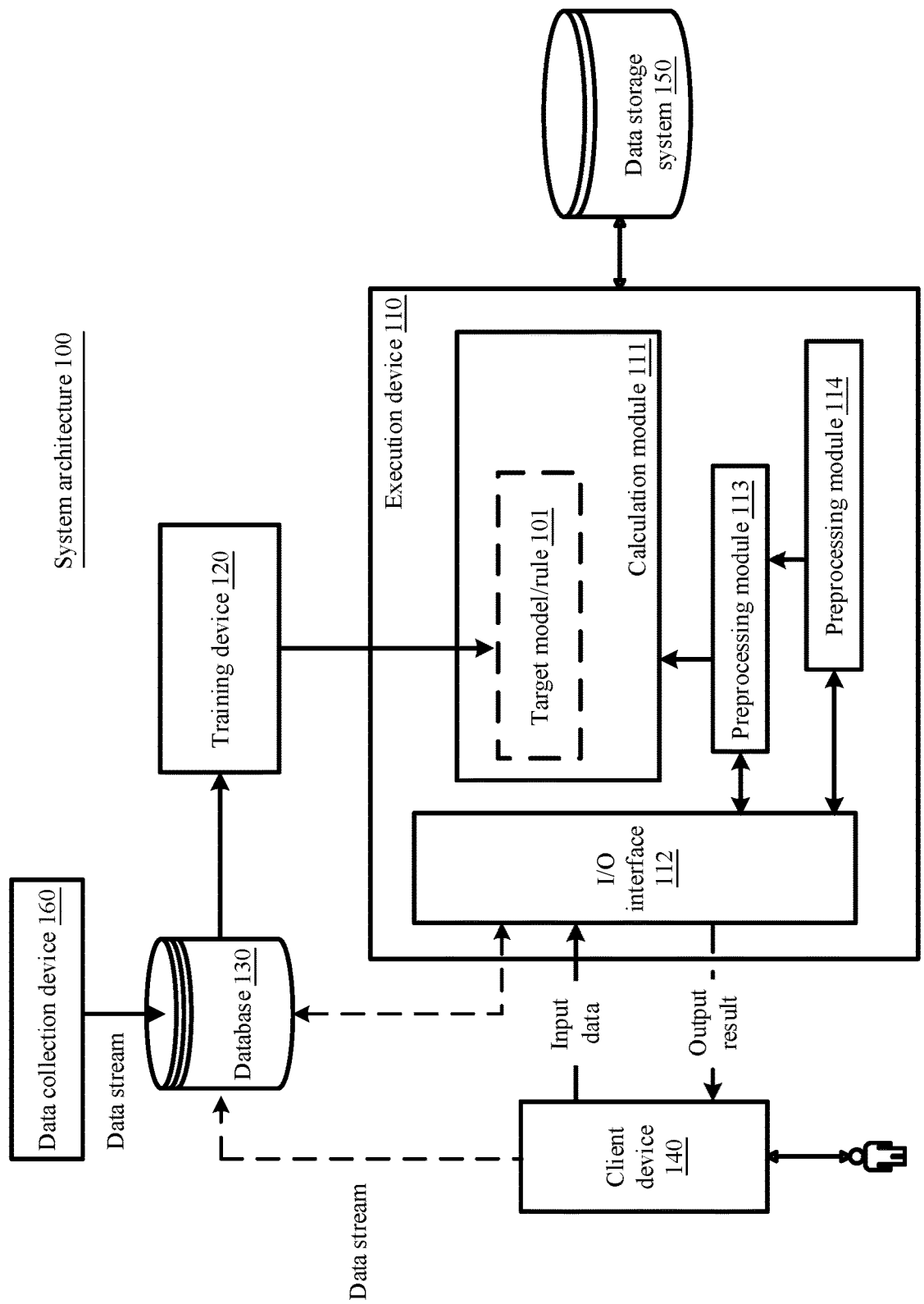
FIG. 1 is a schematic diagram of a structure of a system architecture according to an embodiment of this application.

The following describes technical solutions of this application with reference to the accompanying drawings.

An image classification method in the embodiments of this application may be specifically applied to an album classification scenario and a photographing recognition scenario. The following describes the two scenarios in detail.

Album Classification:

A user stores a large quantity of pictures on a mobile phone and a cloud disk. Classifying and managing an album based on a class can improve user experience. Pictures in the album are classified by using the image classification method in the embodiments of this application, to obtain an album arranged or stored based on a class. The picture classification method in the embodiments of this application can facilitate the user in classifying and managing different object classes, thereby facilitating search by the user, reducing a management time of the user, and improving album management efficiency.

Specifically, when album classification is performed by using the image classification method in the embodiments of this application, picture features of pictures in the album may be first extracted, and then the pictures in the album are classified based on the extracted picture features, to obtain classification results of the pictures. Then, the pictures in the album are classified based on the classification results of the pictures, to obtain an album arranged based on picture classes. When the pictures in the album are arranged based on the picture classes, pictures belonging to a same class may be arranged in a row or in a row. For example, in a finally obtained album, a first row of pictures are all pictures of airplanes, and a second row of pictures are all pictures of cars.

Photographing Recognition:

During photographing, a user may process a photographed picture by using the picture classification method in the embodiments of this application, to automatically recognize a class of a photographed object, for example, automatically recognize that the photographed object is a flower or an animal. Further, in the picture classification method in the embodiments of this application, class hierarchy information is used during training. Therefore, when a photographed object is relatively rare and a system cannot provide an accurate image class (for example, a white-fronted goose), a superclass (for example, birds) to which the object belongs can be recognized by using the picture classification method in the embodiments of this application.

For example, the image classification method in the embodiments of this application is used to recognize a shared bicycle that is photographed, so that it can be recognized that the object is a bicycle, and related information of the bicycle can be further displayed.

It should be understood that album classification and photographing recognition described above are only two specific scenarios to which the image classification method in the embodiments of this application is applied. The image classification method in the embodiments of this application is not limited to the foregoing two scenarios during application. The image classification method in the embodiments of this application can be applied to any scenario in which image classification or image recognition needs to be performed.

The embodiments of this application relate to a large quantity of applications related to a neural network. To better understand the solutions of the embodiments of this application, the following first describes related terms and concepts of the neural network that may be mentioned in the embodiments of this application.

(1) Neural Network

The neural network may include a neuron, and the neuron may be an operation unit whose input is $x_s$ and an intercept 1. Output of the operation unit may be shown as a formula (1-1):

$$h_{W,b}(x) = f(W^T x) = f(\Sigma_{s=1}^{n} W_s x_s + b) \tag{1-1}$$

Herein, $s=1, 2, \ldots, n$, n is a natural number greater than 1, $W_s$ represents a weight of $x_s$, and b represents a bias of the neuron. f represents an activation function of the neuron, where the activation function is used to introduce a nonlinear characteristic into the neural network, to convert an input signal in the neuron into an output signal. The output signal of the activation function may be used as input of a next convolutional layer, and the activation function may be a sigmoid function. The neural network is a network constituted by connecting a plurality of single neurons together. To be specific, output of one neuron may be input of another neuron. Input of each neuron may be connected to a local receptive field of a previous layer, to extract a feature of the local receptive field. The local receptive field may be a region including several neurons.

(2) Deep Neural Network

The deep neural network (DNN), also referred to as a multi-layer neural network, may be understood as a neural network having a plurality of hidden layers. The DNN is divided based on positions of different layers. Neural networks inside the DNN may be classified into three types: an input layer, a hidden layer, and an output layer. Generally, the first layer is the input layer, the last layer is the output layer, and the middle layer is the hidden layer. Layers are fully connected. To be specific, any neuron in the $i^{th}$ layer is necessarily connected to any neuron in the $(i+1)^{th}$ layer.

Although the DNN seems complex, work of each layer is actually not complex, and is simply expressed by the following linear relational expression: $\vec{y}=\alpha(W \cdot \vec{x}+\vec{b})$. $\vec{x}$ represents an input vector, $\vec{y}$ represents an output vector, $\vec{b}$ represents a bias vector, W represents a weight matrix (which is also referred to as a coefficient), and $\alpha()$ represents an activation function. In each layer, only such a simple operation is performed on the input vector $\vec{x}$ to obtain the output vector $\vec{y}$. Due to a large quantity of DNN layers, quantities of coefficients W and bias vectors $\vec{b}$ are also large. These parameters are defined in the DNN as follows: Using the coefficient W as an example, it is assumed that in a three-layer DNN, a linear coefficient from a fourth neuron in a second layer to a second neuron in a third layer is defined as $W_{24}^3$. A superscript 3 represents a number of a layer in which the coefficient W is located, and a subscript corresponds to an index 2 of the third layer for output and an index 4 of the second layer for input.

In conclusion, a coefficient from a $k^{th}$ neuron in an $(L-1)^{th}$ layer to a $j^{th}$ neuron in an $L^{th}$ layer is defined as $W_{jk}^L$.

It should be noted that the input layer has no parameter W. In the deep neural network, more hidden layers make the network more capable of describing a complex case in the real world. Theoretically, a model with more parameters has higher complexity and a larger "capacity". It indicates that the model can complete a more complex learning task. Training of the deep neural network is a process of learning a weight matrix, and a final objective of the training is to obtain a weight matrix of all layers of a trained deep neural network (a weight matrix formed by vectors W of many layers).

(3) Convolutional Neural Network

The convolutional neural network (CNN) is a deep neural network with a convolutional structure. The convolutional neural network includes a feature extractor including a convolutional layer and a sub-sampling layer, and the feature extractor may be considered as a filter. The convolutional layer is a neuron layer that performs convolution processing on an input signal and that is in the convolutional neural network. In the convolutional layer of the convolutional neural network, one neuron may be connected to only a part of neurons in a neighboring layer. A convolutional layer generally includes several feature planes, and each feature plane may include some neurons arranged in a rectangle. Neurons of a same feature plane share a weight, and the shared weight herein is a convolution kernel. Sharing the weight may be understood as that a manner of extracting image information is unrelated to a position. The convolution kernel may be initialized in a form of a matrix of a random size. In a process of training the convolutional neural network, an appropriate weight may be obtained for the convolution kernel through learning. In addition, sharing the weight is advantageous because connections between layers of the convolutional neural network are reduced, and a risk of overfitting is reduced.

(4) A recurrent neural network (RNN) is used to process sequence data. In a conventional neural network model, from an input layer to a hidden layer and then to an output layer, the layers are fully connected, but nodes in each layer are not connected. This common neural network resolves many problems, but is still incompetent to resolve many other problems. For example, to predict a next word in a sentence, a previous word usually needs to be used, because adjacent words in the sentence are not independent. A reason why the RNN is referred to as a recurrent neural network is that current output of a sequence is related to previous output. A specific representation is that the network memorizes previous information and applies the previous information to calculation of the current output. To be specific, nodes in the hidden layer are no longer unconnected, but are connected, and input for the hidden layer includes not only output of the input layer but also output of the hidden layer at a previous moment. Theoretically, the RNN can process sequence data of any length. Training of the RNN is the same as training of a conventional CNN or DNN.

A reason why the recurrent neural network is required when there is the convolutional neural network is simple. In the convolutional neural network, there is a premise that elements are independent of each other, and input and output are also independent, such as a cat and a dog. However, many elements are interconnected in the real world. For example, stocks change over time. For another example, a person says: I like traveling, a most favorite place is Yunnan, and I will go there in the future if there is a chance. If there is a blank to be filled herein, people should know that "Yunnan" is to be filled in. This is because people can make an inference from a context, but how can a machine do this? The RNN emerges. The RNN is designed to enable a machine to have a capability to remember like human beings. Therefore, output of the RNN depends on current input information and historical memory information.

(5) Loss Function

In a process of training a deep neural network, output of the deep neural network is expected to be as close as possible to a predicted value that is actually wanted. Therefore, a predicted value of a current network may be compared with an actually wanted target value, and then a weight vector of each layer of neural network may be updated based on a difference between the two values (certainly, before updating is performed for the first time, there is generally an initialization process, that is, parameters are preconfigured for each layer in the deep neural network). For example, if the predicted value of the network is high, the weight vector is adjusted to lower the predicted value, and the weight vector is continuously adjusted until the deep neural network can predict the actually wanted target value or a value that is very close to the actually wanted target value. Therefore, "how to compare a difference between a predicted value and a target value" needs to be predefined, and a loss function or an objective function is an important equation for measuring the difference between the predicted value and the target value. The loss function is used as an example. A higher output value (loss) of the loss function indicates a larger difference. In this case, training of the deep neural network becomes a process of minimizing the loss as much as possible.

(6) Back Propagation Algorithm

In a training process, a neural network may correct values of parameters in an initial neural network model by using an error back propagation (BP) algorithm, so that a reconstruction error loss of the neural network model becomes increasingly smaller. Specifically, an input signal is forward transferred until an error loss occurs in output, and the parameter in the initial neural network model is updated based on back propagation error loss information, so that the error loss is reduced. The back propagation algorithm is a back propagation motion mainly dependent on the error loss, and aims to obtain an optimal parameter of the neural network model, for example, a weight matrix.

(7) Pixel Value

A pixel value of an image may be a red-green-blue (RGB) color value, and the pixel value may be a long integer representing a color. For example, a pixel value is 256*Red+ 100*Green+76Blue, where Blue represents a blue component, Green represents a green component, and Red represents a red component. In each color component, a smaller value indicates lower luminance, and a larger value indicates higher luminance. For a grayscale image, a pixel value may be a grayscale value.

As shown in FIG. 1, an embodiment of this application provides a system architecture 100. In FIG. 1, a data collection device 160 is configured to collect training data. For the image classification method in the embodiments of this application, the training data may include a training image and a classification result corresponding to the training image, and the classification result of the training image may be a result manually pre-labeled.

After collecting the training data, the data collection device 160 stores the training data into a database 130. A training device 120 obtains a target model/rule 101 by performing training based on the training data maintained in the database 130.

The following describes the obtaining of the target model/rule 101 by the training device 120 based on the training data. The training device 120 processes an input original image, and compares an output image with the original image, until a difference between the image output by the training device 120 and the original image is less than a specific threshold. In this way, training of the target model/rule 101 is completed.

The target model/rule 101 can be used to implement the image classification method in the embodiments of this application. To be specific, after related preprocessing is performed on a to-be-processed image, a to-be-processed image obtained after related preprocessing is input to the target model/rule 101, to obtain a classification result of the image. The target model/rule 101 in this embodiment of this application may be specifically a neural network. It should be noted that, in actual application, the training data maintained in the database 130 may not all be collected by the data collection device 160, or may be received and obtained from another device. It should be further noted that the training device 120 may not necessarily train the target model/rule 101 completely based on the training data maintained in the database 130, or may alternatively obtain training data from a cloud or another place to perform model training. The foregoing description should not be construed as a limitation on the embodiments of this application.

The target model/rule 101 obtained through training by the training device 120 may be applied to different systems or devices, for example, an execution device 110 shown in FIG. 1. The execution device 110 may be a terminal, such as a mobile phone terminal, a tablet computer, a notebook computer, an augmented reality (AR)/virtual reality (VR) terminal, or a vehicle-mounted terminal, or may be a server, a cloud device, or the like. In FIG. 1, an input/output (I/O) interface 112 is configured for the execution device 110, to exchange data with an external device. A user may input data to the I/O interface 112 by using a client device 140. In this embodiment of this application, the input data may include a to-be-processed image input by the client device.

A preprocessing module 113 and a preprocessing module 114 are configured to perform preprocessing based on the input data (for example, the to-be-processed image) received by the I/O interface 112. In this embodiment of this application, there may be no preprocessing module 113 and no preprocessing module 114 (or there may be only one of the preprocessing modules), and the input data is processed directly by using a calculation module 111.

In a process in which the execution device 110 performs preprocessing on the input data or the calculation module 111 of the execution device 110 performs related processing such as calculation, the execution device 110 may invoke data, code, and the like in a data storage system 150 for corresponding processing, and may also store data, instructions, and the like obtained through corresponding processing into the data storage system 150.

Finally, the I/O interface 112 returns a processing result, for example, the obtained classification result of the to-be-processed image, to the client device 140, to provide the processing result to the user.

It should be noted that the training device 120 may generate corresponding target models/rules 101 based on different training data for different objectives or different tasks. The corresponding target models/rules 101 may be used to implement the foregoing objectives or complete the foregoing tasks, to provide required results to the user.

In a case shown in FIG. 1, the user may manually provide input data by operating an interface provided by the I/O interface 112. In another case, the client device 140 may automatically send input data to the I/O interface 112. If authorization of the user needs to be obtained for requesting the client device 140 to automatically send the input data, the user may set corresponding permission on the client device 140. The user may view, on the client device 140, a result output by the execution device 110, and a specific presentation form may be a specific manner such as display, sound, or action. The client device 140 may also serve as a data collection end to collect, as new sample data, input data that is input to the I/O interface 112 and an output result that is output from the I/O interface 112 that are shown in the figure, and store the new sample data into the database 130. Certainly, the client device 140 may alternatively not perform collection, but the I/O interface 112 directly stores, as new sample data into the database 130, input data that is input to the I/O interface 112 and an output result that is output from the I/O interface 112 that are shown in the figure.

It should be noted that FIG. 1 is merely a schematic diagram of a system architecture according to an embodiment of this application. A location relationship between devices, components, modules, and the like shown in the figure does not constitute any limitation. For example, in FIG. 1, the data storage system 150 is an external memory relative to the execution device 110. In other cases, the data storage system 150 may alternatively be disposed in the execution device 110.

As shown in FIG. 1, the target model/rule 101 is obtained through training by the training device 120. In this embodiment of this application, the target model/rule 101 may be a neural network in this application. Specifically, the neural network provided in the embodiments of this application may be a CNN, a deep convolutional neural network (DCNN), a recurrent neural network (RNN), or the like.

Because the CNN is a very common neural network, a structure of the CNN is described below in detail with reference to FIG. 2. As described in the foregoing description of basic concepts, the convolutional neural network is a deep neural network with a convolutional structure, and is a deep learning architecture. The deep learning architecture is to perform multi-level learning at different abstract levels by using a machine learning algorithm. As a deep learning architecture, the CNN is a feed-forward artificial neural network, and each neuron in the feed-forward artificial neural network can respond to an image input to the feed-forward artificial neural network.

Figure 2:
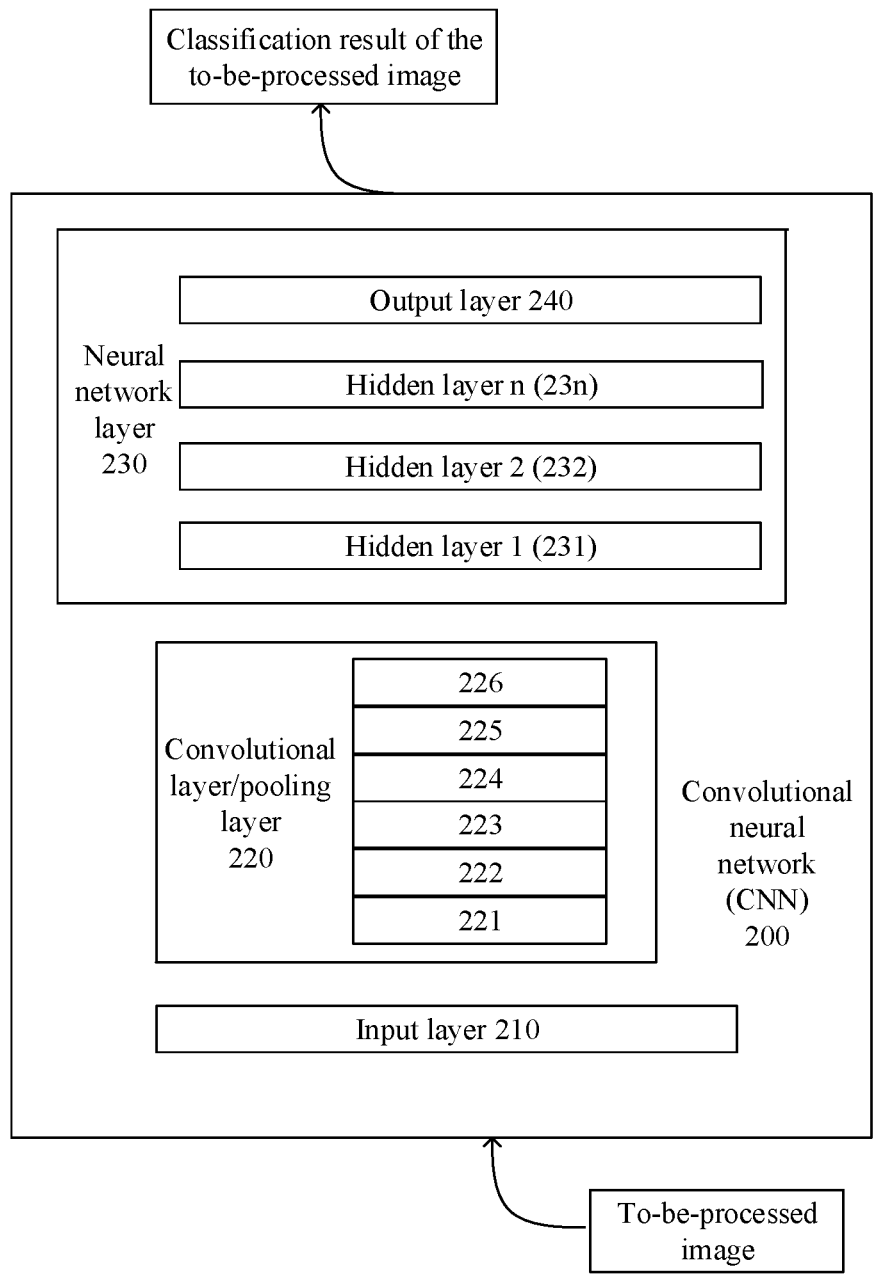
FIG. 2 is a schematic diagram of performing image classification based on a convolutional neural network model according to an embodiment of this application.

As shown in FIG. 2, a convolutional neural network (CNN) 200 may include an input layer 210, a convolutional layer/pooling layer 220 (the pooling layer is optional), and a neural network layer 230. The following describes related content of these layers in detail.

Convolutional Layer/Pooling Layer 220:
Convolutional Layer:

As shown in FIG. 2, the convolutional layer/pooling layer 220 may include, for example, layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer; and in another implementation, the layers 221 and 222 are convolutional layers, the layer 223 is a pooling layer, the layers 224 and 225 are convolutional layers, and the layer 226 is a pooling layer. In other words, output of a convolutional layer may be used as input for a subsequent pooling layer, or may be used as input for another convolutional layer, to continue to perform a convolution operation.

The following describes internal working principles of the convolutional layer by using the convolutional layer 221 as an example.

The convolutional layer 221 may include a plurality of convolution operators. The convolution operator is also referred to as a kernel. In image processing, the convolution operator functions as a filter for extracting specific information from an input image matrix. The convolution operator may be essentially a weight matrix, and the weight matrix is usually predefined. In a process of performing a convolution operation on an image, the weight matrix usually processes pixels one by one (or two by two, . . . , depending on a value of a stride) in the input image in a horizontal direction, to complete work of extracting a specific feature from the image. A size of the weight matrix should be related to a size of the image. It should be noted that a depth dimension of the weight matrix is the same as a depth dimension of the input image. In a process of performing convolution computation, the weight matrix extends to an entire depth of the input image. Therefore, convolution with a single weight matrix produces convolution output of a single depth dimension, but in most cases, instead of using a single weight matrix, a plurality of weight matrices of a same size (row×column) are used, that is, a plurality of homogeneous matrices are used. Output of each weight matrix is stacked to form a depth dimension of a convolutional image. The dimension herein may be understood as being determined by the "plurality of" described above. Different weight matrices may be used to extract different features in an image. For example, one weight matrix is used to extract image edge information, another weight matrix is used to extract a specific color of the image, and still another weight matrix is used to blur unnecessary noises in the image. Sizes (row×column) of the plurality of weight matrices are the same, and sizes of feature maps extracted by the plurality of weight matrices of the same size are also the same. Then, the plurality of extracted feature maps of the same size are combined to form output of the convolution computation.

In actual application, a lot of training needs to be performed to obtain weight values in these weight matrices. Weight matrices constituted by the weight values obtained through training may be used to extract information from the input image, so that the convolutional neural network 200 performs correct prediction.

When the convolutional neural network 200 has a plurality of convolutional layers, an initial convolutional layer (for example, the layer 221) usually extracts more general features, where the general features may also be referred to as low-level features. As a depth of the convolutional neural network 200 increases, a deeper convolutional layer (for example, the layer 226) extracts more complex features, such as high-level semantic features. Higher-level semantic features are more applicable to a problem to be resolved.

Pooling Layer/Pooling Layer 220:

A quantity of training parameters usually needs to be reduced. Therefore, a pooling layer usually needs to be periodically introduced after a convolutional layer. For the layers 221 to 226 illustrated in 220 in FIG. 2, one convolutional layer may be followed by one pooling layer, or a plurality of convolutional layers may be followed by one or more pooling layers. In a process of image processing, the pooling layer is only used to reduce a space size of an image. The pooling layer may include an average pooling operator and/or a maximum pooling operator, to sample an input image to obtain an image of a relatively small size. The average pooling operator may calculate pixel values in an image within a specific range to generate an average value as a result of average pooling. The maximum pooling operator may select a pixel with a largest value in a specific range as a result of maximum pooling. In addition, just as a size of a weight matrix in a convolutional layer should be related to a size of an image, an operator in a pooling layer should be related to a size of an image. A size of an image processed and output by a pooling layer may be less than a size of an image input to the pooling layer, and each pixel in the image output by the pooling layer represents an average value or a maximum value of a corresponding sub-area of the image input to the pooling layer.

Neural Network Layer 230:

After processing is performed by the convolutional layer/pooling layer 220, the convolutional neural network 200 still cannot output required output information, because the convolutional layer/pooling layer 220 only extracts a feature and reduces a parameter obtained from an input image, as described above. However, to generate final output information (required class information or other related information), the convolutional neural network 200 needs to use the neural network layer 230 to generate output of one required class or output of a quantity of a group of required classes. Therefore, the neural network layer 230 may include a plurality of hidden layers (231, 232, . . . , and 23*n* shown in FIG. 2) and an output layer 240. Parameters included in the plurality of hidden layers may be obtained by performing training in advance based on related training data of a specific task type. For example, the task type may include image recognition, image classification, super-resolution image reconstruction, or the like.

The output layer 240 follows the plurality of hidden layers in the neural network layer 230, that is, the output layer 240 is the last layer of the entire convolutional neural network 200. The output layer 240 has a loss function similar to classification cross entropy, where the loss function is specifically used to calculate a prediction error. Once forward propagation of the entire convolutional neural network 200 (as shown in FIG. 2, propagation from 210 to 240 is forward propagation) is completed, weight values and deviations of the layers mentioned above start to be updated in back propagation (as shown in FIG. 2, propagation from 240 to 210 is back propagation), to reduce a loss of the convolutional neural network 200 and an error between a result output by the convolutional neural network 200 by using the output layer and a desired result.

It should be noted that the convolutional neural network 200 shown in FIG. 2 is merely an example of a convolutional neural network, and in specific application, the convolutional neural network may alternatively exist in a form of another network model.

In this application, a to-be-processed image may be processed by using the convolutional neural network 200 shown in FIG. 2, to obtain a classification result of the to-be-processed image. As shown in FIG. 2, after the to-be-processed image is processed by the input layer 210, the convolutional layer/pooling layer 220, and the neural network layer 230, the classification result of the to-be-processed image is output.

Figure 3:
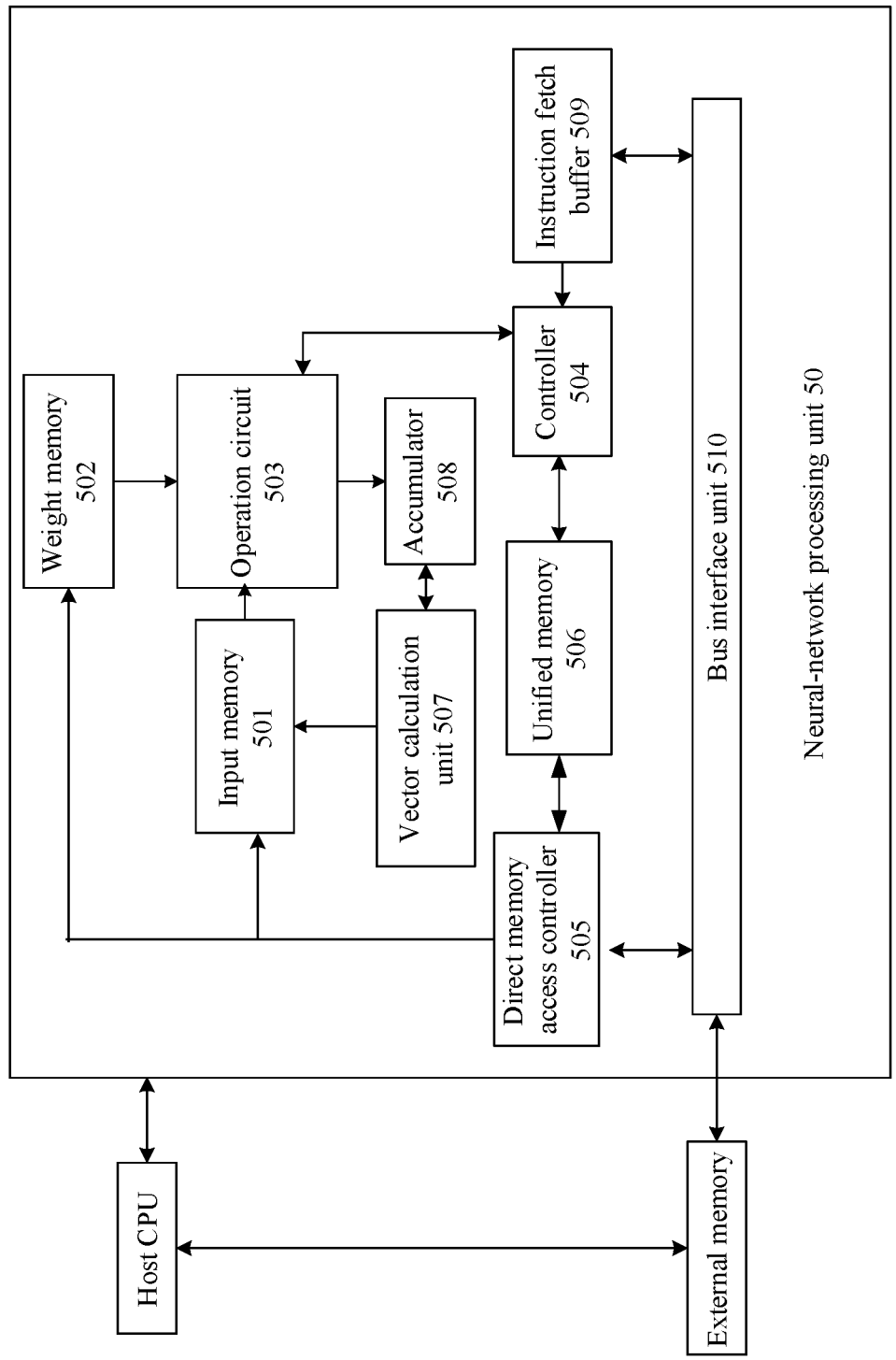
FIG. 3 is a schematic diagram of a hardware structure of a chip according to an embodiment of this application.

FIG. 3 shows a hardware structure of a chip according to an embodiment of this application. The chip includes a neural network processing unit 50. The chip may be disposed in the execution device 110 shown in FIG. 1, to complete calculation work of the calculation module 111. The chip may alternatively be disposed in the training device 120 shown in FIG. 1, to complete training work of the training device 120 and output the target model/rule 101. All algorithms at the layers in the convolutional neural network shown in FIG. 2 may be implemented on the chip shown in FIG. 3.

The neural network processing unit NPU 50 is mounted to a host CPU as a coprocessor, and the host CPU allocates a task to the NPU 50. A core part of the NPU is an operation circuit 503, and a controller 504 controls the operation circuit 503 to extract data in a memory (a weight memory or an input memory) and perform an operation.

In some implementations, the operation circuit 503 includes a plurality of processing engines (PEs). In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit 503 fetches data corresponding to the matrix B from a weight memory 502, and buffers the data on each PE in the operation circuit 503. The operation circuit 503 fetches data of the matrix A from an input memory 501, to perform a matrix operation with the matrix B to obtain a partial result or a final result of a matrix, and stores the result in an accumulator 508.

A vector calculation unit 507 may perform further processing on output of the operation circuit 503, such as vector multiplication, vector addition, exponential operation, logarithm operation, and size comparison. For example, the vector calculation unit 507 may be configured to perform network calculation, such as pooling, batch normalization, or local response normalization, at a non-convolutional/non-FC layer in a neural network.

In some implementations, the vector calculation unit 507 can store a processed output vector in a unified buffer 506. For example, the vector calculation unit 507 may apply a nonlinear function to the output of the operation circuit 503, for example, to a vector of an accumulated value, so as to generate an activation value. In some implementations, the vector calculation unit 507 generates a normalized value, a combined value, or both. In some implementations, the processed output vector can be used as activation input for the operation circuit 503, for example, the processed output vector is used in a subsequent layer in the neural network.

The unified memory 506 is configured to store input data and output data.

For weight data, a direct memory access controller (DMAC) 505 moves input data in an external memory to the input memory 501 and/or the unified memory 506, stores weight data in the external memory into the weight memory 502, and stores data in the unified memory 506 into the external memory.

A bus interface unit (BIU) 510 is configured to implement interaction between the host CPU, the DMAC, and an instruction fetch buffer 509 through a bus.

The instruction fetch buffer 509 connected to the controller 504 is configured to store instructions used by the controller 504.

The controller 504 is configured to invoke the instructions buffered in the instruction fetch buffer 509, to control a working process of the operation accelerator.

Generally, the unified memory 506, the input memory 501, the weight memory 502, and the instruction fetch buffer 509 are all on-chip memories. The external memory is a memory outside the NPU, and may be a double data rate synchronous dynamic random access memory (DDR SDRAM), a high bandwidth memory (HBM), or another readable and writable memory.

Operations of the layers in the convolutional neural network shown in FIG. 2 may be performed by the operation circuit 503 or the vector calculation unit 307.

The execution device 110 in FIG. 1 described above can perform steps of the image classification method in the embodiments of this application. The CNN model shown in FIG. 2 and the chip shown in FIG. 3 may also be configured to perform steps of the image classification method in the embodiments of this application. The following describes in detail the image classification method in the embodiments of this application with reference to the accompanying drawings.

The foregoing describes in detail basic content of a neural network and related apparatuses and models in the embodiments of this application with reference to FIG. 1 to FIG. 3. The following describes in detail the image classification method in the embodiments of this application with reference to FIG. 4.

Figure 4:
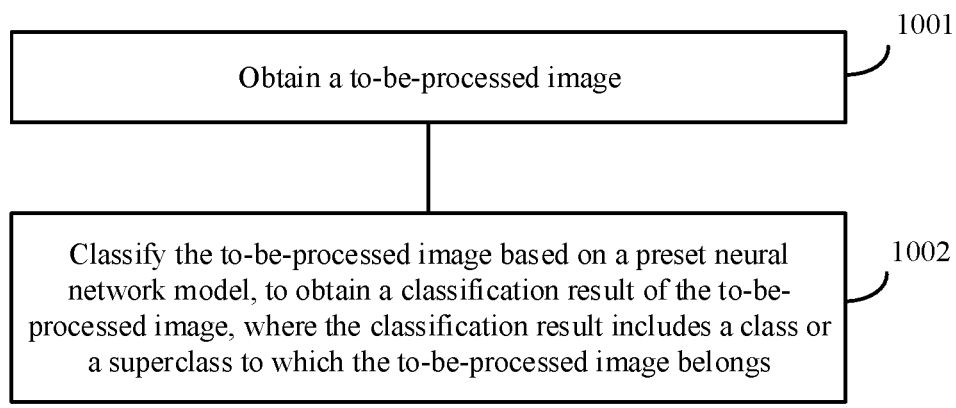
FIG. 4 is a schematic flowchart of an image classification method according to an embodiment of this application.

FIG. 4 is a schematic flowchart of an image classification method according to an embodiment of this application. The method shown in FIG. 4 may be performed by an image classification apparatus, and the image classification apparatus herein may be an electronic device having an image processing function. The electronic device may be specifically a mobile terminal (for example, a smartphone), a computer, a personal digital assistant, a wearable device, a vehicle-mounted device, an internet of things device, or another device capable of performing image processing.

The method shown in FIG. 4 includes steps 1001 and 1002. The following separately describes steps 1001 and 1002 in detail.

1001. Obtain a to-be-processed image.

The to-be-processed image may be a to-be-classified image or picture (an image or a picture on which classification processing needs to be performed). When the method shown in FIG. 4 is performed by an electronic device, the to-be-processed image may be a picture captured by the electronic device by using a camera, or the to-be-processed image may be a picture obtained from an interior of the electronic device (for example, a picture in an album of the electronic device).

1002. Classify the to-be-processed image based on a preset neural network model, to obtain a classification result of the to-be-processed image.

The classification result of the to-be-processed image includes a class or a superclass to which the to-be-processed image belongs. The neural network model is obtained by performing training based on a plurality of training images, a label of each of the plurality of training images, and class hierarchy information of the plurality of training images. The class hierarchy information of the plurality of training images includes at least one superclass to which each of a plurality of classes belongs. The plurality of classes include a class to which each of the plurality of training images belongs.

To be specific, the class hierarchy information of the plurality of training images includes not only the class to which each of the plurality of training images belongs, but also at least one superclass to which each of the plurality of training images belongs. The at least one superclass to which each training image belongs is at least one superclass to which a class (the class to which each training image belongs) of each training image belongs.

The label of each training image includes the class to which each training image belongs.

It should be understood that the class to which each image belongs may be understood as a general classification of the image, may be considered as a relatively basic classification of the image, and is a class to which an object in the image belongs. Generally, a finer classification is not performed on the image on the basis of the classification.

The superclass to which the class of the image belongs is equivalent to a parent class of the class to which the object in the image belongs, and the superclass is a higher-level classification above the class. The superclass may be equivalent to the parent class. Generally, classes of images with some common characteristics may be classified into a superclass. In addition, the superclass may also be referred to as a category.

For example, the plurality of training images include training images 1 to 4, and the training images 1 to 4 are respectively images of an apple, an orange, a lion, and a tiger. In this case, classes to which the training images 1 to 4 belong are respectively apples, oranges, lions, and tigers.

For another example, the plurality of training images also include training images 1 to 4, and classes to which the training images 1 to 4 belong are respectively apples, oranges, lions, and tigers. In this case, class hierarchy information of the training images 1 to 4 includes: Apples and oranges belong to fruits, and lions and tigers belong to animals. In other words, a superclass to which apples and oranges belong is fruits, and a superclass to which lions and tigers belong is animals.

It should be understood that the at least one superclass may include superclasses of different levels, and a superclass with a higher level is also a superclass of a superclass with a lower level.

Each class may belong to a plurality of superclasses, and these superclasses have different levels.

For example, the training image 1 is an image of an apple, a class of the training image 1 is apples, and superclasses to which the class of the training image 1 belongs may include fruits and plants. Fruits may be a superclass of a first level, and plants may be a superclass of a second level. The superclass of the second level may also be considered as a superclass of the superclass of the first level.

In this application, when the neural network model is trained, not only labels of the plurality of training images but also the class hierarchy information of the plurality of training images is used. That is, when the neural network model used to perform image classification in this application is trained, not only classes to which the plurality of training images belong but also superclasses to which the plurality of training images belong are considered. Therefore, a better classification result can be obtained when the neural network model obtained through training in this training manner is used to classify the to-be-processed image.

Specifically, when the neural network model is trained, more abundant information (the labels of the plurality of training images and the class hierarchy information of the plurality of training images) is used. Therefore, a more accurate neural network model can be obtained through training, and it is more likely to obtain a better classification result when an image is classified based on the neural network model.

Optionally, the plurality of training images include images in a source class.

The source class may be a large-scale training set. The source class may be analogous to human knowledge accumulation, and the images in the source class may be images of known image classes.

The images in the source class included in the plurality of training images may be from an ILSVRC2012 data set. Specifically, the images in the source class may include images of 1000 classes in the ILSVRC2012 data set.

Optionally, the plurality of training images may further include images in a novel class.

The source class is generally a class with large-scale data, and the novel class is generally a class with only a few samples. For the source class, images in the source class are generally training images. Images in the novel class generally include some training images (images with labels) and some test images (images without labels).

The images in the source class may be from an ILSVRC2010 data set. Specifically, the images in the source class may include one to five images in each class of image in the ILSVRC2010 data set.

The class hierarchy information of the plurality of training images may be pre-labeled, or may be determined based on association information between word vectors corresponding to the labels of the plurality of training images.

Specifically, the following two manners may be used to determine the class hierarchy information of the plurality of training images.

First manner: The at least one superclass to which each of the plurality of classes belongs is pre-labeled.

In the first manner, the at least one superclass to which each of the plurality of classes belongs may be labeled based on experience; or some dedicated databases may be used during labeling, and the superclass may be labeled based on classification information of images queried from the dedicated databases.

Because accuracy of manual labeling is generally higher, pre-labeling the at least one superclass to which each of the plurality of classes belongs can make labeling of the superclass more accurate, so that obtained class hierarchy information is also more accurate.

Second manner: The at least one superclass to which each of the plurality of classes belongs is determined based on association degree information between word vectors corresponding to the labels of the plurality of training images.

The association degree information can reflect a degree of association (which may be measured by a magnitude of the association degree) between the word vectors. If word vectors corresponding to labels of several training images are closely associated, classes to which the several training images belong are relatively close, and several classes to which the several training images belong may be classified into a superclass.

The association degree information may be specifically distance information. In this case, distances between word vectors may be used to measure association degrees between different word vectors. Generally, a shorter distance between two word vectors indicates a higher association degree between the two word vectors.

The word vectors corresponding to the labels of the plurality of training images may be specifically obtained by processing the plurality of training images by using a text model.

The text model may be specifically Word2vec. Word2vec is an efficient tool for representing words as real valued vectors that is open sourced by Google® in 2013. By using an idea of deep learning, Word2vec can simplify, through training, processing of text content into a vector operation in K-dimensional vector space, and a similarity in vector space may be used to represent a similarity in text semantics. Word vectors output by Word2vec may be used to do a lot of work related to natural language processing (NLP), such as clustering, synonym searching, and part-of-speech analysis.

Figure 5:
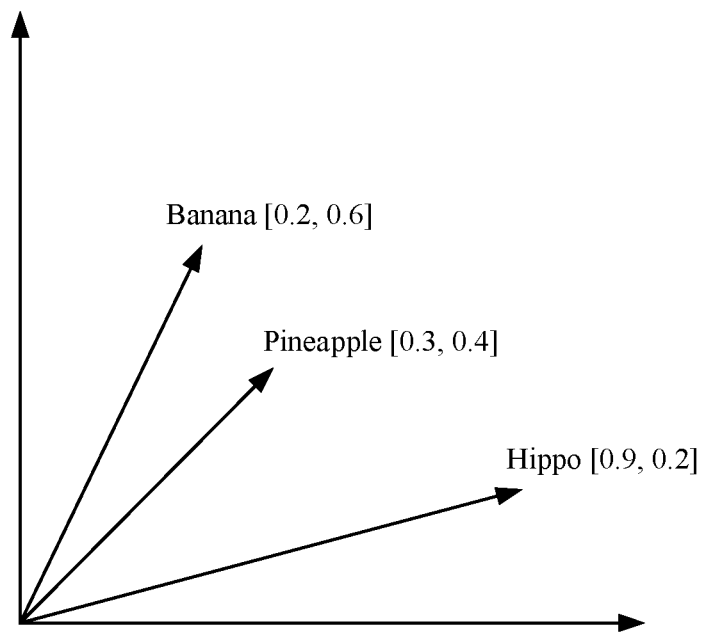
FIG. 5 is a schematic diagram of distribution of word vectors in a coordinate system.

For example, when the text model is Word2vec, and input training images are respectively images of a banana, a pineapple, and a hippo, word vectors obtained after processing of the text model are respectively banana [0.2, 0.6], pineapple [0.3, 0.4], and hippo [0.9, 0.2]. Distribution of these word vectors in a coordinate system is shown in FIG. 5. It can be learned from FIG. 5 that the banana and the pineapple are fruits, and a difference between word vectors of the banana and the pineapple is closer.

The text model may alternatively be a model such as doc2vec or TextCNN.

Figure 6:
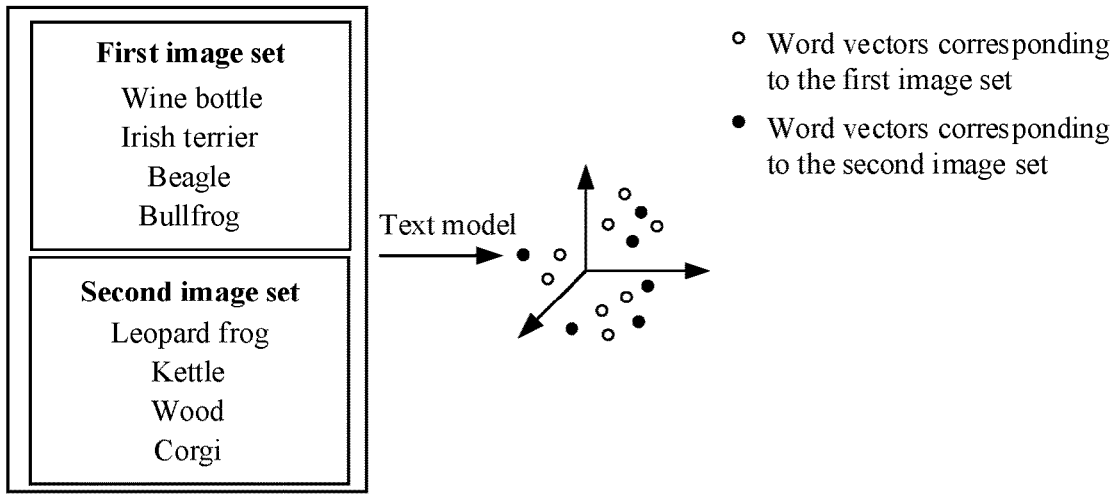
FIG. 6 is a schematic diagram of distribution of word vectors respectively corresponding to a first image set and a second image set in a coordinate system.

For example, as shown in FIG. 6, labels of images in a first image set (the labels of the images include classes of the images) include a wine bottle, an Irish terrier, a beagle, and a bullfrog, and labels of images in a second image set include a leopard frog, a kettle, wood, and a corgi. The labels of the images in the first image set and the second image set are processed by using the text model, and obtained word vectors are shown on the right side of FIG. 6.

Generally, at least one superclass to which a class of an image belongs may be obtained by using a clustering algorithm or through clustering processing. Specifically, the at least one superclass to which each of the plurality of classes belongs may be obtained by performing clustering processing on the word vectors corresponding to the labels of the plurality of training images.

In a process of performing clustering processing on the word vectors corresponding to the labels of the plurality of training images, association degrees between the word vectors corresponding to the labels of the plurality of training images are considered, word vectors with relatively high association degrees may be clustered together, and corresponding training images can also be classified into a same superclass.

Data may be aggregated into several groups through clustering processing. When clustering processing is performed, algorithms such as a K-Means clustering algorithm, a mean shift clustering algorithm, and a hierarchical clustering algorithm may be specifically used for clustering processing.

Optionally, all the images included in the first image set and the second image set are images in a source class.

Optionally, the images included in the first image set are images in a source class, and the images included in the second image set are images in a novel class.

Optionally, the images included in the first image set are images in a novel class, and the images included in the second image set are images in a source class.

The source class may be a large-scale training set. The source class may be analogous to human knowledge accumulation, and the images in the source class may be images of known image classes. The images in the novel class are generally images that do not appear in the source class, and are test images that need to be recognized.

In the second manner, the at least one superclass to which each of the plurality of classes belongs may alternatively be obtained by performing clustering processing on the word vectors corresponding to the labels of the plurality of training images.

It should be understood that, in a process of performing clustering processing on the word vectors corresponding to the labels of the plurality of training images, association degrees between the word vectors corresponding to the labels of the plurality of training images are considered, word vectors with relatively high association degrees may be clustered together, and corresponding training images can also be classified into a same superclass.

Figure 7:
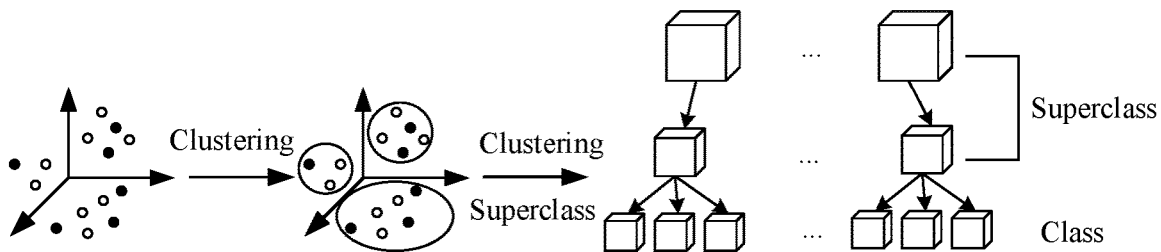
FIG. 7 shows a process of performing clustering processing on word vectors to obtain a superclass.

For example, FIG. 7 shows a process of performing clustering processing on the word vectors obtained in FIG. 6 to obtain a superclass. As shown in FIG. 7, word vectors that are relatively close can be clustered together through clustering. Then, an average value of the word vectors clustered together may be determined as a word vector of a superclass, so that a superclass to which a plurality of different classes belong can be obtained. Further, clustering continues to be performed on superclasses, and an average value of word vectors of the superclasses clustered together is determined as a word vector of a superclass of an upper level, so that the superclass of the upper level can be obtained. In this way, superclasses of a plurality of levels can be obtained. As shown on the rightmost side of FIG. 7, a finally obtained clustering result includes a class of one level and superclasses of two levels.

It should be understood that FIG. 7 shows only a case in which two levels of superclasses are included. Actually, a quantity of levels of superclasses obtained through clustering may be determined based on an actual requirement.

In step 1002, a feature vector of the to-be-processed image may be first determined, then confidence that the to-be-processed image belongs to a plurality of candidate classes may be determined based on the feature vector of the to-be-processed image, and then the classification result of the to-be-processed image may be determined.

The following describes in detail a specific manner of determining the classification result of the to-be-processed image in step 1002.

Optionally, in an embodiment, the classifying the to-be-processed image based on a preset neural network model, to obtain a classification result of the to-be-processed image in step 1002 includes: extracting a feature vector of the to-be-processed image; determining, based on the feature vector of the to-be-processed image, confidence that the to-be-processed image belongs to each of a plurality of candidate classes; and determining the classification result of the to-be-processed image from the plurality of candidate classes based on the confidence that the to-be-processed image belongs to each of the plurality of candidate classes.

When the feature vector of the to-be-processed image is obtained, the to-be-processed image may be processed by using a feature extraction network in a neural network. Specifically, the feature vector of the to-be-processed image may be obtained by performing convolution processing on the to-be-processed image by using a convolutional layer in the feature extraction network.

When the confidence that the to-be-processed image belongs to each of the plurality of candidate classes is determined based on the feature vector of the to-be-processed image, the feature vector of the to-be-processed image may be processed by using a classifier in the neural network, to determine the confidence that the to-be-processed image belongs to each of the plurality of candidate classes.

The confidence that the to-be-processed image belongs to each of the plurality of candidate classes may specifically refer to a probability that the to-be-processed image belongs to each of the plurality of candidate classes.

The plurality of candidate classes may be all candidate classes included in the neural network model. In this case, confidence that the to-be-processed image belongs to each of all the candidate classes needs to be determined.

Optionally, the plurality of candidate classes may alternatively be candidate classes whose corresponding confidence is greater than a specific preset value in all candidate classes. In this case, the class to which the to-be-processed image belongs needs to be determined only from the candidate classes whose corresponding confidence is relatively high, and the class to which the to-be-processed image belongs does not need to be determined from all the candidate classes.

For example, the plurality of candidate classes may be candidate classes whose corresponding confidence is greater than 3% in all candidate classes. In this case, the class to which the to-be-processed image finally belongs may be determined from the candidate classes whose corresponding confidence is greater than 3%.

It should be understood that 3% may be considered as a confidence threshold, and a value of 3% is merely a specific example. In actual application, a specific value of the confidence threshold may be flexibly set based on a specific situation.

When the classification result of the to-be-processed image is determined from the plurality of candidate classes based on the confidence that the to-be-processed image belongs to each of the plurality of candidate classes, a candidate class corresponding to highest confidence may be determined as the classification result of the to-be-processed image, or a plurality of candidate classes whose confidence is greater than a specific threshold may be determined as the classification result of the to-be-processed image.

For example, the plurality of candidate classes include apples, oranges, and bananas, and confidence that the to-be-processed image belongs to apples, oranges, and bananas is 20%, 30%, and 50%, respectively. Confidence that the to-be-processed image belongs to bananas is highest. Therefore, it can be determined that the to-be-processed image belongs to bananas. That is, the classification result of the to-be-processed image is bananas.

When the to-be-processed image is classified, image classes that can be selected may include a plurality of candidate classes and/or a plurality of candidate superclasses. The plurality of candidate classes herein may be a general classification of the image, and may be considered as a relatively basic classification of the image. Generally, a further classification is not performed on the image on the basis of the classification.

The superclass may be a larger classification based on the general image class. For example, the foregoing image classes may be specific classes such as apples, oranges, and pears. Because apples, oranges, and pears all belong to fruits, a corresponding superclass may be fruits. For another example, the foregoing image classes may be specific classes such as tigers, lions, and zebras. Because tigers, lions, and zebras all belong to animals, a corresponding superclass may be animals.

The following first describes in detail a case in which the image classes that can be selected include a plurality of candidate classes.

Optionally, in an embodiment, the determining the classification result of the to-be-processed image from the plurality of candidate classes based on the confidence that the to-be-processed image belongs to each of the plurality of candidate classes includes: determining a first candidate class in the plurality of candidate classes as the classification result of the to-be-processed image, where the first candidate class is a class with highest confidence in the plurality of candidate classes.

For example, the plurality of candidate classes include apples, oranges, pears, cantaloupes, and bananas, and confidence that the to-be-processed image belongs to apples, oranges, pears, cantaloupes, and bananas is 10%, 15%, 15%, 30%, and 30%, respectively. In these classes, confidence that the to-be-processed image belongs to bananas is highest. Therefore, bananas may be directly used as the classification result of the to-be-processed image.

The image classes that can be selected may further include a plurality of candidate superclasses, and this case is described below.

Optionally, in an embodiment, the method further includes: determining a first candidate superclass in a plurality of candidate superclasses as the classification result of the to-be-processed image, where the confidence of the first candidate class is less than a first confidence threshold, and confidence of the first candidate superclass is greater than or equal to a second confidence threshold.

When the confidence of the candidate classes to which the to-be-processed image belongs is relatively low, a candidate superclass whose confidence meets a requirement may be determined as a classification of the to-be-processed image. In this way, when the image class to which the to-be-processed image belongs cannot be recognized, the superclass to which the to-be-processed image belongs can be recognized, and a corresponding recognition result can be output. Therefore, in this application, when confidence corresponding to the image class is relatively low, a recognition result can still be output, thereby implementing recognition of the to-be-processed image.

The first confidence threshold and the second confidence threshold may be preset thresholds, and specific values of the first confidence threshold and the second confidence threshold may be set based on experience or an actual requirement. Values of the first confidence threshold and the second confidence threshold may be the same or different (the first confidence threshold may be greater than the second confidence threshold, or the first confidence threshold may be less than the second confidence threshold).

For example, both the first confidence threshold and the second confidence threshold are 50%, the first candidate class is apples, confidence that the to-be-processed image belongs to apples is 40%, the first candidate superclass is fruits, and confidence that the to-be-processed image belongs to fruits is 60%. In this case, because the confidence that the to-be-processed image belongs to the class of apples is less than 50%, and the confidence that the to-be-processed image belongs to the superclass of fruits is 60%, it can be determined that the classification result of the to-be-processed image is fruits.

It should be understood that, in a general scenario, the feature vector of the to-be-processed image may be directly extracted, then confidence that the to-be-processed image belongs to each of a plurality of candidate classes may be determined based on the feature vector of the to-be-processed image, and then the class of the to-be-processed image may be determined based on the confidence that the to-be-processed image belongs to each of the plurality of candidate classes.

However, in some specific scenarios, different manners may be used to determine the class of the to-be-processed image. For example, in a few-shot learning scenario, it can be generally determined that the to-be-processed image belongs to one class of a plurality of reference images. In this case, the to-be-processed image and the reference images may be simultaneously input, image features of the reference images and an image feature of the to-be-processed image may be extracted, and then the image class of the to-be-processed image may be determined from the reference pictures based on differences between the image feature of the to-be-processed image and the image features of the reference images.

The following describes in detail an image classification process in a few-shot learning scenario.

Optionally, in an embodiment, the classifying the to-be-processed image based on a preset neural network model, to obtain a classification result of the to-be-processed image includes: obtaining reference images of the to-be-processed image, where the reference images include a plurality of classes of images, and the to-be-processed image belongs to one of the plurality of classes of images; extracting a feature vector of the to-be-processed image and a feature vector of each class of image in the plurality of classes of images; determining, based on a difference between the feature vector of the to-be-processed image and the feature vector of each class of image in the plurality of classes of images, confidence that the to-be-processed image belongs to each class of image in the plurality of classes of images; and determining the classification result of the to-be-processed image from the plurality of classes of images based on the confidence that the to-be-processed image belongs to each class of image in the plurality of classes of images.

In the few-shot learning scenario, when the to-be-processed image is recognized, the class to which the to-be-processed image belongs may be directly selected from a plurality of classes to which the reference images belong, based on differences between the feature vector of the to-be-processed image and feature vectors of the reference images, to determine the classification result of the to-be-processed image.

Figure 8:
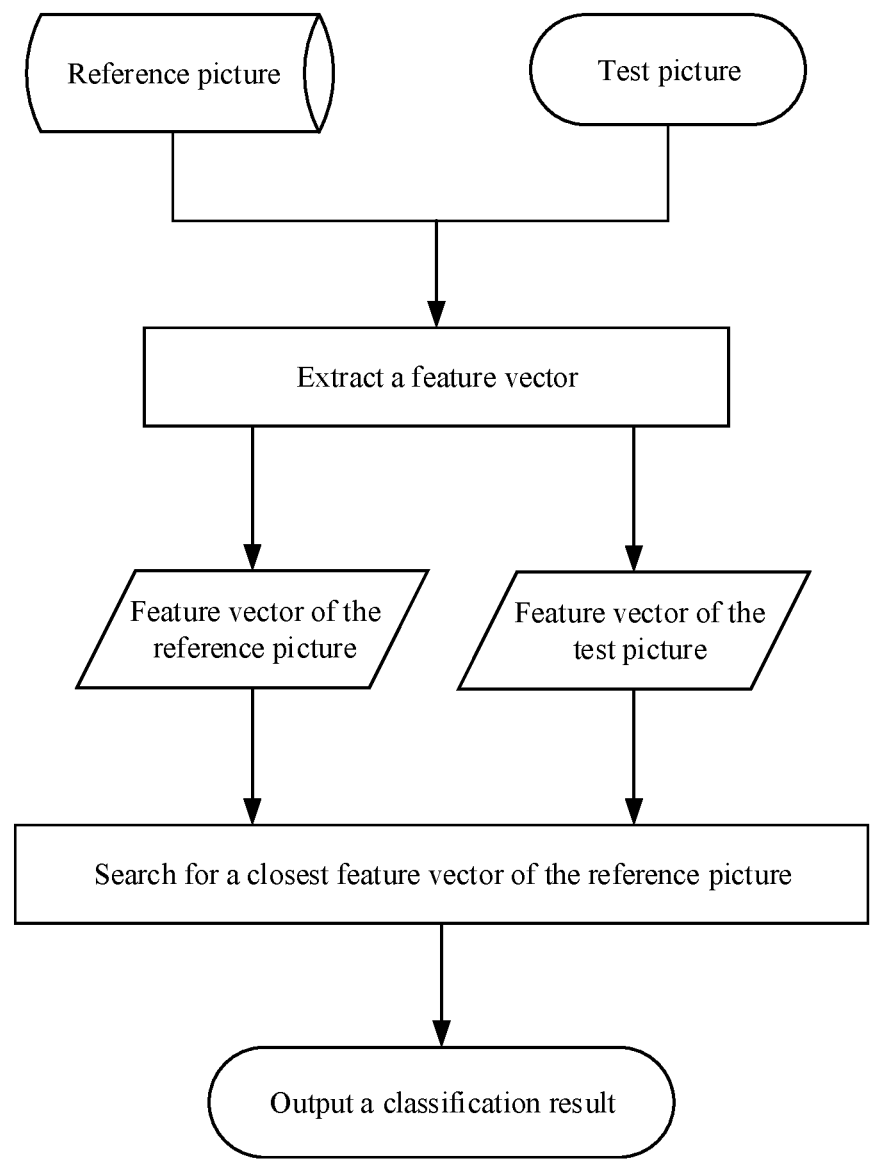
FIG. 8 is a schematic diagram of an image classification process in a few-shot learning scenario.

To better understand the image classification process in the few-shot learning scenario, the following describes image classification in the few-shot learning scenario in detail with reference to FIG. 8.

As shown in FIG. 8, reference pictures and a test picture are input. The reference pictures include a plurality of classes of images, and the test picture belongs to one class of image in the plurality of classes of images in the reference pictures. After the reference pictures and the test picture are obtained, feature extraction may be performed by using the feature extraction network in the neural network, to obtain feature vectors of the reference pictures and a feature vector of the test picture. Then, the feature vectors of the reference pictures may be searched for a feature vector closest (nearest) to the feature vector of the test picture, and an image class corresponding to the feature vector may be determined as a class of the test picture, to obtain and output a classification result of the test picture.

In FIG. 8, the feature extraction network in the neural network model in step 1002 may be used when a feature network is extracted. When the neural network model in step 1002 is trained, not only a class to which a training picture belongs but also a superclass to which the training picture belongs is considered. Therefore, a more accurate feature vector can be extracted when the feature extraction network in the neural network model is used to perform feature extraction, so that accuracy of a final classification result can be improved.

The image classification methods in the general scenario and the few-shot learning scenario are described in detail above with reference to the accompanying drawings. The following describes in detail an image classification method in a zero-shot learning scenario with reference to FIG. 9.

Figure 9:
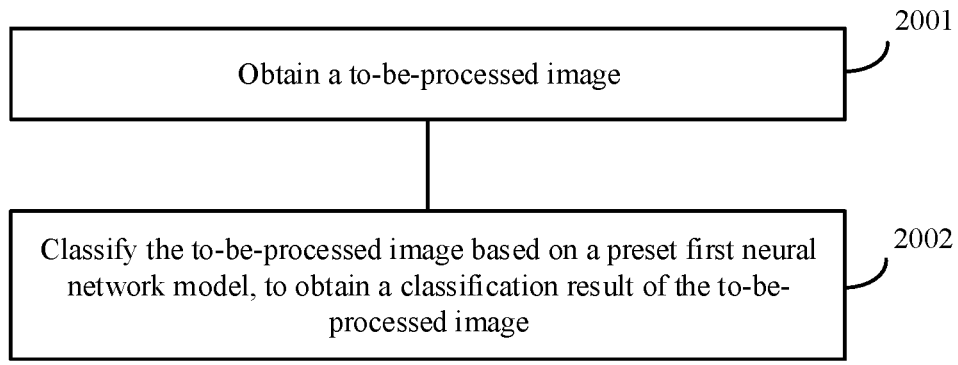
FIG. 9 is a schematic flowchart of an image classification method according to an embodiment of this application.

FIG. 9 is a schematic flowchart of an image classification method according to an embodiment of this application. The method shown in FIG. 9 may be performed by an image classification apparatus, and the image classification apparatus herein may be an electronic device having an image processing function. The electronic device may be specifically a mobile terminal (for example, a smartphone), a computer, a personal digital assistant, a wearable device, a vehicle-mounted device, an internet of things device, or another device capable of performing image processing.

The method shown in FIG. 9 includes steps 2001 and 2002. The following separately describes steps 2001 and 2002 in detail.

2001. Obtain a to-be-processed image.

A process of obtaining the to-be-processed image in step 2001 is similar to that in step 1001, and details are not described herein.

2002. Classify the to-be-processed image based on a preset first neural network model, to obtain a classification result of the to-be-processed image.

The classification result of the to-be-processed image includes a class or a superclass to which the to-be-processed image belongs. The first neural network model is obtained by performing training based on a plurality of first feature vectors, labels of a plurality of first training images, and semantic description information of the plurality of first training images.

Semantic description information of each training image is a semantic description of an image feature of each first training image.

For example, if a picture is an image of a zebra, semantic description information of the picture may include: There are black and white stripes, and a shape is similar to that of a horse.

For another example, if a picture is a picture of a giraffe, semantic description information of the picture may include: There is a long neck, and there are spots on the surface.

The plurality of first feature vectors are feature vectors obtained by performing feature extraction on the plurality of first training images by a second neural network model. The second neural network model is obtained by performing training based on a plurality of second training images, a label of each of the plurality of second training images, and class hierarchy information of the plurality of second training images. The class hierarchy information of the plurality of second training images includes a class to which each of the plurality of second training images belongs and at least one superclass to which each of the plurality of second training images belongs.

The second neural network model in the method shown in FIG. 9 is equivalent to the neural network model in the method shown in FIG. 4, and class hierarchy information of a training image is also used in a process of training the second neural network model. Therefore, more accurate feature information can be extracted when the second neural network model performs feature extraction, so that a better classification result can be obtained when the image is subsequently classified based on the first neural network model.

In this application, the class hierarchy information of the training image is used during training of the second neural network model. Therefore, a more comprehensive or accurate image feature can be extracted when the second neural network subsequently performs feature extraction, so that the more comprehensive or accurate image feature is used during training of the first neural network model. Therefore, a better or more accurate classification result can be obtained when the image is classified by using the first neural network model.

The classifying the to-be-processed image based on a preset first neural network model, to obtain a classification result of the to-be-processed image in step 2002 specifically includes: extracting a feature vector of the to-be-processed image based on the second neural network model; processing the feature vector of the to-be-processed image based on the first neural network model, to obtain a semantic vector of the to-be-processed image; and comparing the semantic vector of the to-be-processed image with a candidate semantic vector, to obtain the classification result of the to-be-processed image.

Optionally, the comparing the semantic vector of the to-be-processed image with a candidate semantic vector, to obtain the classification result of the to-be-processed image includes: determining an image class corresponding to a first candidate semantic vector as the classification result of the to-be-processed image, where an association degree between the first candidate semantic vector and the semantic vector of the to-be-processed image meets a preset requirement.

That the association degree between the first candidate semantic vector and the semantic vector of the to-be-processed image meets the preset requirement may specifically mean that a distance between the first candidate semantic vector and the semantic vector of the to-be-processed image is less than a preset distance.

Figure 10:
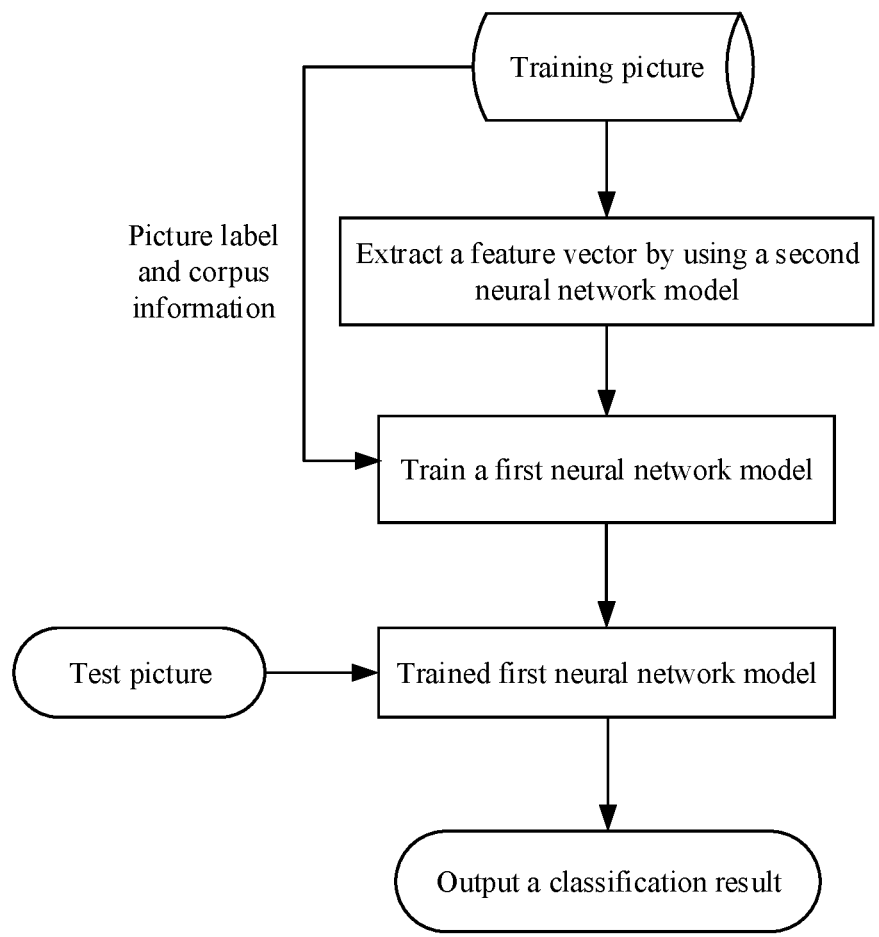
FIG. 10 is a schematic diagram of an image classification process in a zero-shot learning scenario.

To better understand an image classification process in a zero-shot learning scenario, the following describes image classification in the zero-shot learning scenario in detail with reference to FIG. 10.

As shown in FIG. 10, a feature vector of a training picture is extracted by using the second neural network model, and then the first neural network model is trained based on the extracted feature vector of the training picture and a picture label and semantic description information of the training picture, to obtain a trained first neural network model. Then, the trained first neural network model may be used to process a test picture, to obtain a classification result of the test picture. The second neural network model in FIG. 10 is equivalent to the neural network model in the method shown in FIG. 4, and class hierarchy information of a training image is also used in a process of training the second neural network model. Therefore, more accurate feature information can be extracted when the second neural network model performs feature extraction, so that a better classification result can be obtained when the image is subsequently classified based on the first neural network model.

The foregoing describes in detail the image classification methods in the embodiments of this application in different scenarios with reference to the accompanying drawings. Actually, when image classification is performed, an input picture needs to be processed by using a neural network model, to obtain an image classification result. Therefore, before image classification is performed, a corresponding neural network model needs to be trained to obtain a trained neural network model, and then the trained neural network model is used to perform image classification.

The following describes in detail a neural network training method in the embodiments of this application with reference to the accompanying drawings.

Figure 11:
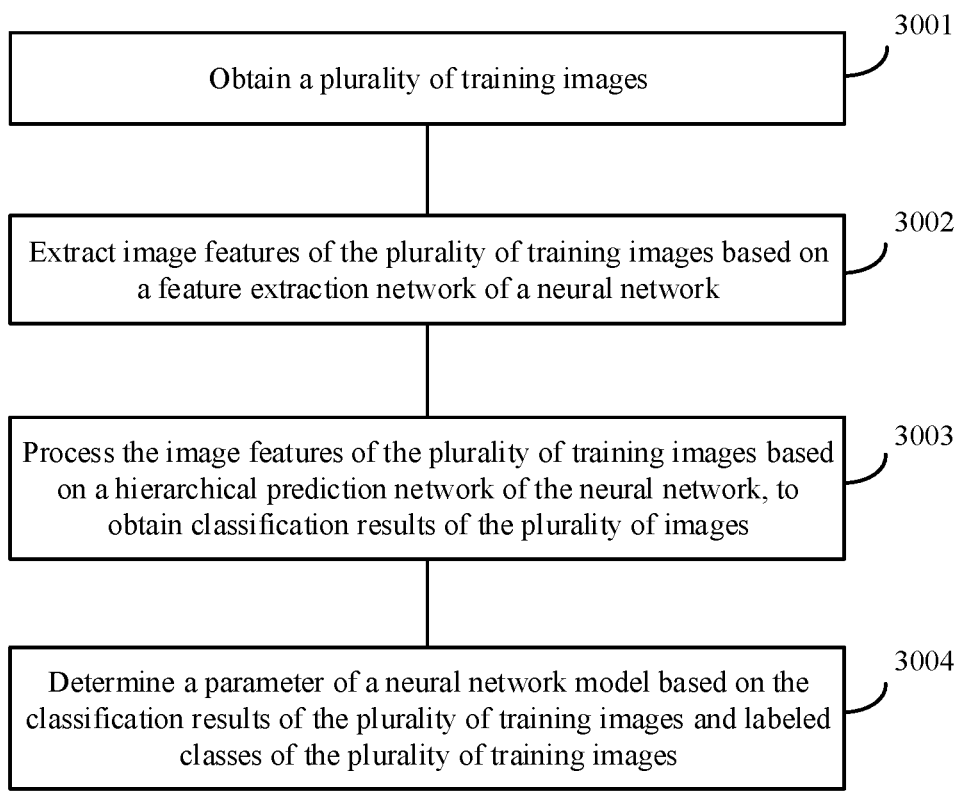
FIG. 11 is a schematic flowchart of a neural network training method according to an embodiment of this application.

FIG. 11 is a schematic flowchart of a neural network training method according to an embodiment of this application. The method shown in FIG. 11 may be performed by a device having a relatively strong operation capability, such as a computer device, a server device, or an operation device. The method shown in FIG. 11 includes steps 3001 to 3004. The following separately describes these steps in detail.

3001. Obtain a plurality of training images.

3002. Extract image features of the plurality of training images based on a feature extraction network of a neural network.

3003. Process the image features of the plurality of training images based on a hierarchical prediction network of the neural network, to obtain classification results of the plurality of images.

A classification result of each of the plurality of images includes a class and a superclass to which the training image belongs.

3004. Determine a parameter of a neural network model based on the classification results of the plurality of training images and labeled classes of the plurality of training images.

In this application, when the neural network is trained, not only the class to which the training image belongs but also the superclass to which the training image belongs is used. The neural network is trained by using more comprehensive information, so that a better neural network model can be obtained. Therefore, an image can be better classified by using the neural network model, and a better or more accurate classification result can be obtained.

It should be understood that the neural network model in the method shown in FIG. 4 and the second neural network model in the method shown in FIG. 9 may be obtained by performing training according to the neural network training method shown in FIG. 11.

Figure 12:
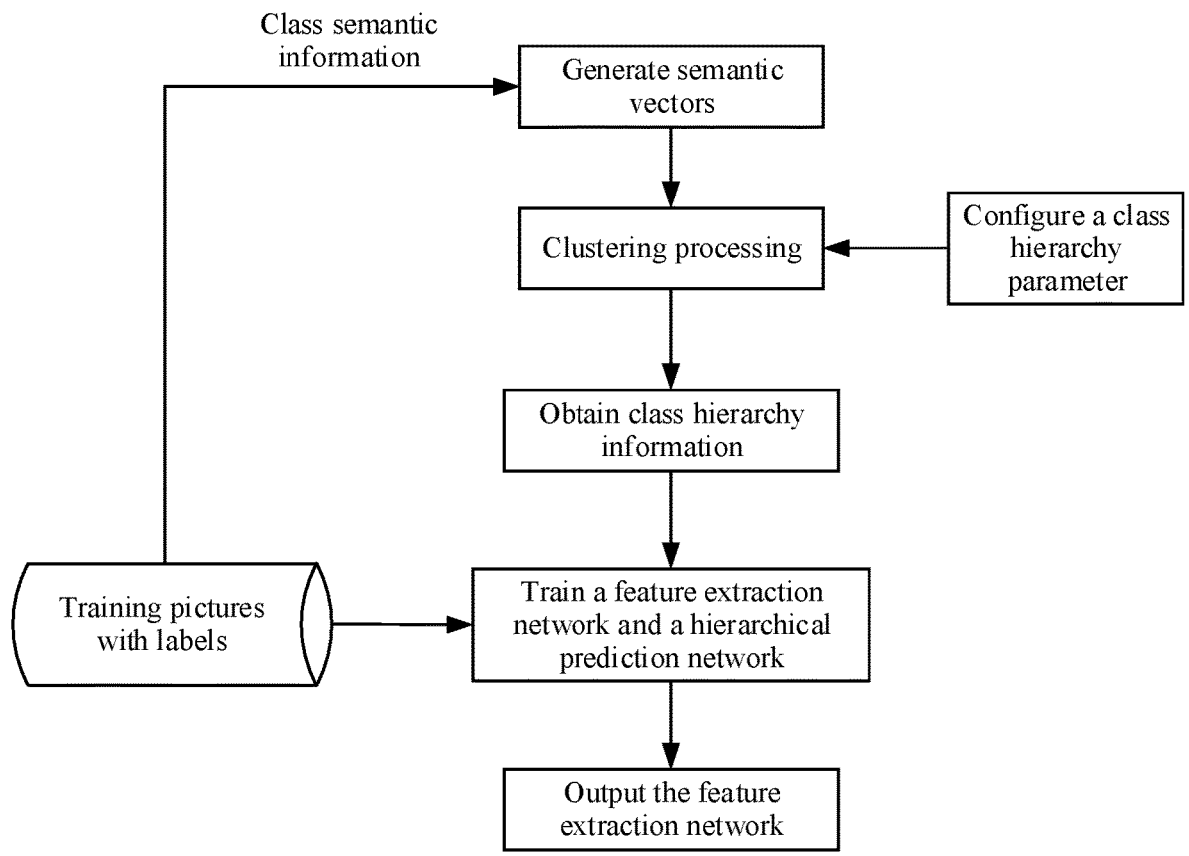
FIG. 12 is a schematic diagram of a neural network training process.
Figure 13:
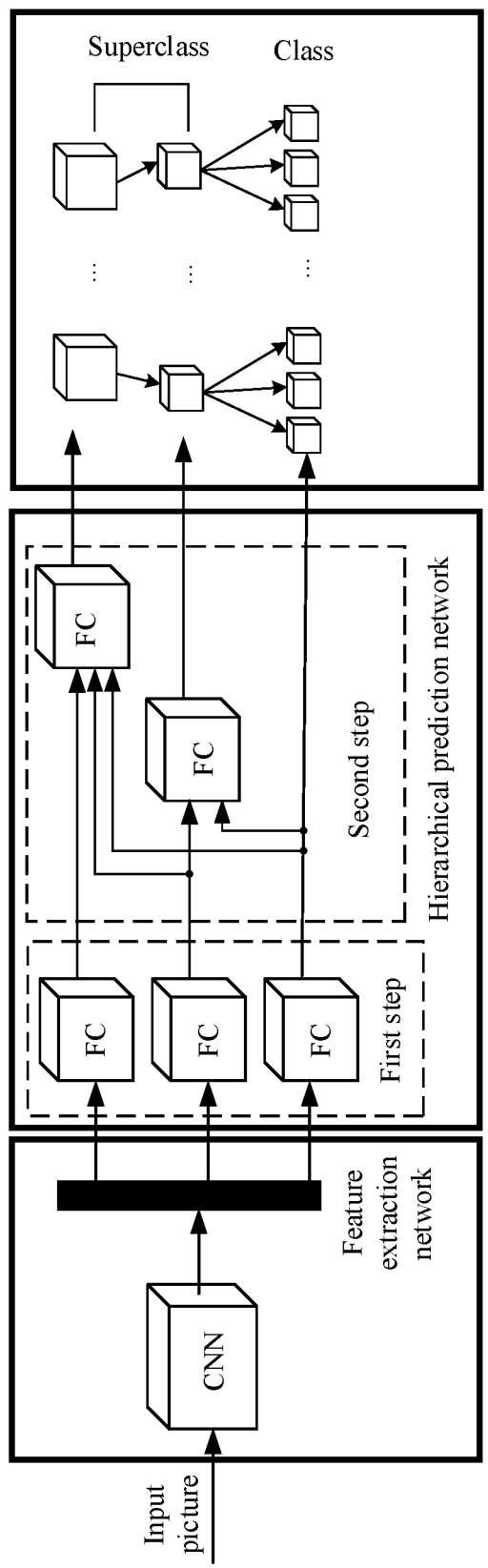
FIG. 13 is a schematic diagram of a neural network training process.

The following first describes in detail a training process of the neural network training method in this embodiment of this application with reference to FIG. 12 and FIG. 13.

As shown in FIG. 12, semantic vectors of training pictures are generated based on class semantic information of the training pictures (the class semantic information herein is used to describe classes of the training pictures), and then clustering processing is performed on the semantic vectors of the training pictures to obtain class hierarchy information of the training pictures. The class hierarchy information includes a superclass to which the classes of the training pictures belong. Then, the feature extraction network and the hierarchical prediction network are trained based on the training pictures with labels and the class hierarchy information of the training pictures, to obtain the feature extraction network.

In the process shown in FIG. 12, a class hierarchy parameter may be configured before clustering is performed, so that clustering processing may be performed based on the configured class hierarchy parameter. The class hierarchy parameter herein may include a quantity of levels of superclasses included in the class hierarchy information. For example, levels of superclasses may be set to 2 by using the class hierarchy parameter.

To describe the neural network training process more vividly, the following continues to describe the neural network training process with reference to FIG. 13. As shown in FIG. 13, a training picture is input. The feature extraction network processes the training picture, to extract a feature vector of the training picture. Then, the hierarchical prediction network processes the feature vector of the training picture, to obtain a classification result of the training picture (the classification result includes a class of the training picture and at least one superclass to which the class of the training picture belongs). Then, the output classification result of the training picture is compared with a pre-labeled classification result of the training picture, to calculate a loss function. When the loss function converges or a function value of the loss function meets a requirement, the training is ended, and a trained neural network model is obtained.

A loss function shown in formula (1) may be defined for any training image.

$$p_{l_i} = F^1_{l_i}(G(x)), i = 1, \ldots, n+1 \quad (1)$$

$$\hat{p}_{l_i} = F^2_{l_i}\left(\bigoplus_{j=1}^{i} p_{l_j}\right), i = 2, \ldots, n+1$$

$$L(x, Y; \Theta) = L_{cls}(y_{l_1}, p_{l_1}) + \sum_{i=2}^{n+1} \lambda_i L_{cls}(y_{l_i}, \hat{p}_{l_i})$$

In formula (1), $L(x, Y; \Theta)$ represents the loss function, $L_{cls}(y_{l_i}, p_{l_i})$ represents a class loss function, where the class loss function may be used to measure accuracy of a class of a training image, $L_{cls}(y_{l_i}, \hat{p}_{l_i})$ represents a superclass loss function, where the superclass loss function may be used to measure accuracy of a superclass to which the class of the training image belongs, $\lambda_i$ represents a weight corresponding to an $i^{th}$ superclass, $p_{l_i}$ represents output of a fully-connected network in an $i^{th}$ layer in the first step, and $\hat{p}_{l_i}$ represents final output of the fully-connected network in the $i^{th}$ layer in the second step. G represents a forward direction of a depth network (a CNN in FIG. 13), $F^1_{l_i}$ and $F^2_{l_i}$ represent forward directions of the fully-connected network in the $i^{th}$ layer in the first step and the second step, respectively, and $\oplus$ is a splicing operation symbol. $Y=\{y_{l_i}\}, i=1, \ldots, n+1$ represents a set of images x labels, $y_{l_i}$ represents a label of a superclass/class of an $i^{th}$ level, and n represents a quantity of levels of superclasses.

When the neural network is trained, if $L(x, Y; \Theta)$ converges or a function value of $L(x, y; \Theta)$ meets a requirement (for example, is less than a preset value), the training may be stopped, to obtain a trained neural network.

After the trained neural network model is obtained, classification processing may be performed on an image based on the trained neural network model.

To better describe an effect of the image classification method in this embodiment of this application, the following describes a classification effect of the image classification method in this embodiment of this application in the few-shot learning scenario with reference to specific test data.

In the few-shot learning scenario, an ILSVRC2012/2010 data set is used to test the classification effect of the image classification method in this embodiment of this application. Specifically, when the classification effect of the image classification method in this embodiment of this application is tested, 1000 classes in the ILSVRC2012 data set are used as a set of source classes, and 360 classes in the ILSVRC2010 data set (which are not overlapped with the 1000 classes in the ILSVRC2012 data set) are used as a set of novel classes.

First, before the image classification method in this embodiment of this application is tested, a neural network model is trained by using a training set, and then an effect of performing the image classification method in this embodiment of this application by a trained neural network is tested by using a test set. The training set includes all data in the 1000 classes in the ILSVRC2012 data set and one to five novel-class samples in each of the 360 classes in the ILSVRC2010 data set. The test set includes all remaining novel-class samples in the 360 classes in the ILSVRC2010 data set.

Herein, top-K classification accuracy is used to measure image classification effects of existing solutions and the solution of this application. Table 1 shows classification accuracy of the existing solutions (a PPA solution and an LSD solution) and the solution of this application when K=1 (top-1 classification accuracy) to K=5 (top-5 classification accuracy).

The existing solutions include a few-shot image recognition by predicting parameters from activations (few-shot image recognition by predicting parameters from activations) solution, and this solution is abbreviated as PPA (short for "predicting parameters from activations") in Table 1.

The existing solutions further include a "low-shot learning with large-scale diffusion" solution, and this solution is abbreviated as LSD (short for "large-scale diffusion") in Table 1.

TABLE 1

| Solution | K = 1 | K = 2 | K = 3 | K = 4 | K = 5 |
| --- | --- | --- | --- | --- | --- |
| PPA | 33.0 | 43.1 | 48.5 | 52.5 | 55.4 |
| LSD | 33.2 | 44.7 | 50.2 | 53.4 | 57.6 |
| Solution of this application | 39.0 | 48.9 | 54.9 | 58.7 | 60.5 |

It can be learned from Table 1 that, when K=1 to K=5, the classification accuracy of the solution of this application is greater than the classification accuracy of the existing solutions. This is mainly because the neural network used in the image classification method in this embodiment of this application is trained by using more comprehensive information, so that a better classification effect can be obtained when the neural network performs image classification.

The foregoing describes the classification effect of the image classification method in this embodiment of this application in the few-shot learning scenario with reference to Table 1. The following describes a classification effect of the image classification method in this embodiment of this application in a "zero-shot learning" scenario with reference to Table 2.

In the zero-shot learning (few-shot learning) scenario, an ILSVRC2012/2010 data set is used to test the classification effect of the image classification method in this embodiment of this application.

Specifically, when the classification effect of the image classification method in this embodiment of this application is tested, 1000 classes in the ILSVRC2012 data set are used as a set of source classes, and 360 classes in the ILSVRC2010 data set (which are not overlapped with the 1000 classes in the ILSVRC2012 data set) are used as a set of novel classes.

First, before the image classification method in this embodiment of this application is tested, a neural network model is trained by using a training set, and then an effect of performing the image classification method in this embodiment of this application by a trained neural network is tested by using a test set. The training set includes all data in the 1000 classes in the ILSVRC2012 data set (the training set includes only source-class data), and the test set includes all novel-class samples in the 360 classes in the ILSVRC2010 data set.

Herein, top-5 classification accuracy is used to measure image classification effects of existing solutions and the solution of this application. Table 2 shows top-5 classification accuracy of the existing solutions (an AMP solution, an SS-Voc solution, a DeViSE solution, a ConSE solution, a VZSL solution, a DEM solution, and an SAE solution) and the solution of this application.

In addition, the existing solutions in Table 2 specifically include the following solutions:
the absorbing Markov chain process (AMP) solution;
the semi-supervised vocabulary-informed learning (SS-Voc) solution;
the deep visual-semantic embedding (DeViSE) solution;
the convex combination of semantic embeddings (ConSE) solution;
the variational autoencoder for zero-shot learning (VZSL) solution;
the deep embedding model (DEM) solution; and
the semantic autoencoder (SAE) solution.

TABLE 2

| Solution | Top-5 Accuracy |
| --- | --- |
| AMP | 13.1 |
| SS-Voc | 16.8 |
| DeViSE | 12.8 |
| ConSE | 15.5 |
| VZSL | 23.1 |
| DEM | 25.7 |
| SAE | 27.2 |
| Solution of this application | 27.9 |

It can be learned from Table 2 that the top-5 classification accuracy of the solution of this application is greater than the classification accuracy of the existing solutions. This is mainly because the neural network used in the image classification method in this embodiment of this application is trained by using more comprehensive information, so that a better classification effect can be obtained when the neural network performs image classification.

Figure 14:
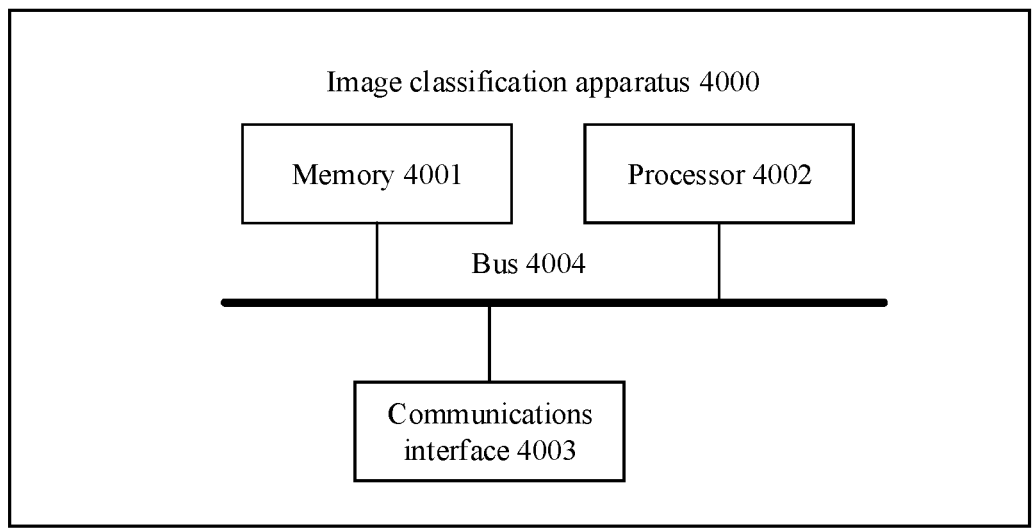
FIG. 14 is a schematic diagram of a hardware structure of an image classification apparatus according to an embodiment of this application.

FIG. 14 is a schematic diagram of a hardware structure of an image classification apparatus according to an embodiment of this application. An image classification apparatus 4000 shown in FIG. 14 includes a memory 4001, a processor 4002, a communications interface 4003, and a bus 4004. The memory 4001, the processor 4002, and the communications interface 4003 implement communication connection to each other through the bus 4004.

The memory 4001 may be a read only memory (ROM), a static storage device, a dynamic storage device, or a random access memory (RAM). The memory 4001 may store a program. When the program stored in the memory 4001 is executed by the processor 4002, the processor 4002 and the communications interface 4003 are configured to perform steps of the image classification method in the embodiments of this application.

The processor 4002 may use a general-purpose central processing unit (CPU), a microprocessor, an application-specific integrated circuit (ASIC), a graphics processing unit (GPU), or one or more integrated circuits, and is configured to execute a related program, to implement a function that needs to be performed by a unit in the image classification apparatus in this embodiment of this application, or perform the image classification method in the method embodiment of this application.

The processor 4002 may be an integrated circuit chip and has a signal processing capability. In an implementation process, steps of the image classification method in the embodiments of this application may be accomplished by using an integrated logic circuit of hardware in the processor 4002 or instructions in a form of software.

The foregoing processor 4002 may be a general-purpose processor, a digital signal processor (DSP), an ASIC, a field programmable gate array (FPGA) or another programmable logic device, a discrete gate or transistor logic device, or a discrete hardware component. The foregoing general-purpose processor may be a microprocessor or the processor may be any conventional processor, decoder, or the like. Steps of the methods disclosed with reference to the embodiments of this application may be directly executed and accomplished by a hardware decoding processor, or may be executed and accomplished by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 4001, and the processor 4002 reads information in the memory 4001, and completes, in combination with hardware of the processor 4002, a function that needs to be performed by a unit included in the image classification apparatus in this embodiment of this application, or performs the image classification method in the method embodiment of this application.

The communications interface 4003 uses a transceiving apparatus such as but not limited to a transceiver, to implement communication between the apparatus 4000 and another device or a communications network. For example, a to-be-processed image may be obtained through the communications interface 4003.

The bus 4004 may include a path through which information is transmitted between various components (for example, the memory 4001, the processor 4002, and the communications interface 4003) of the apparatus 4000.

Figure 15:
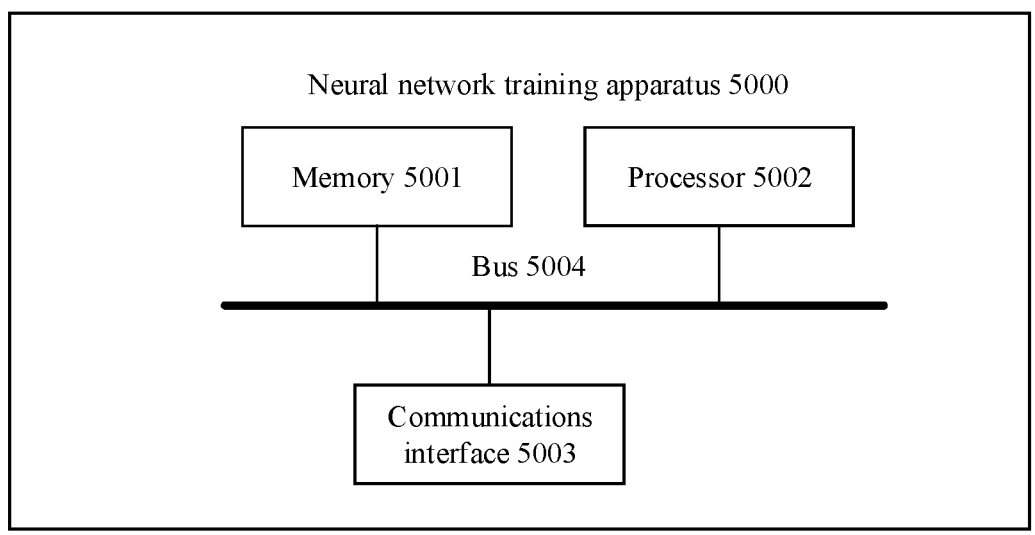
FIG. 15 is a schematic diagram of a hardware structure of a neural network training apparatus according to an embodiment of this application.

FIG. 15 is a schematic diagram of a hardware structure of a neural network training apparatus according to an embodiment of this application. Similar to the apparatus 4000, a neural network training apparatus 5000 shown in FIG. 15 includes a memory 5001, a processor 5002, a communications interface 5003, and a bus 5004. The memory 5001, the processor 5002, and the communications interface 5003 implement communication connection to each other through the bus 5004.

The memory 5001 may store a program. When the program stored in the memory 5001 is executed by the processor 5002, the processor 5002 is configured to perform steps of the neural network training method in the embodiments of this application.

The processor 5002 may use a general-purpose CPU, a microprocessor, an ASIC, a GPU, or one or more integrated circuits, and is configured to execute a related program, to perform the neural network training method in the embodiments of this application.

The processor 5002 may alternatively be an integrated circuit chip and has a signal processing capability. In an implementation process, steps of the neural network training method in the embodiments of this application may be accomplished by using an integrated logic circuit of hardware in the processor 5002 or instructions in a form of software.

It should be understood that the neural network training apparatus 5000 shown in FIG. 15 is used to train a neural network, and a neural network obtained through training may be used to perform the image classification method in the embodiments of this application. Specifically, the neural network model in the method shown in FIG. 4 and the second neural network model in the method shown in FIG. 9 can be obtained by training the neural network by using the apparatus 5000.

Specifically, the apparatus shown in FIG. 15 may obtain training data and a to-be-trained neural network from the outside through the communications interface 5003, and then the processor trains the to-be-trained neural network based on the training data.

It should be noted that although the apparatus 4000 and the apparatus 5000 show only the memory, the processor, and the communications interface, in a specific implementation process, a person skilled in the art should understand that the apparatus 4000 and the apparatus 5000 may further include another component necessary for normal operation. In addition, based on a specific requirement, a person skilled in the art should understand that the apparatus 4000 and 5000 may further include hardware components for implementing other additional functions. In addition, a person skilled in the art should understand that the apparatus 4000 and the apparatus 5000 may include only components required for implementing the embodiments of this application, and do not need to include all components shown in FIG. 14 and FIG. 15.

A person of ordinary skill in the art may be aware that, with reference to the units and algorithm steps described in the examples of the embodiments disclosed in this specification, the embodiments of this application may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or a part of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image classification method, comprising:
obtaining a to-be-processed image; and
classifying the to-be-processed image based on a preset neural network model, to obtain a classification result of the to-be-processed image,
wherein the classification result comprises a class or a superclass to which the to-be-processed image belongs,
wherein the neural network model is obtained by performing training based on a plurality of training images, a label of each training image of the plurality of training images, and class hierarchy information of the plurality of training images,
wherein the class hierarchy information of the plurality of training images comprises at least one superclass to which each of a plurality of classes belongs, and the plurality of classes comprise one or more classes to which the plurality of training images belong, and
wherein the at least one superclass to which each of the plurality of classes belongs is pre-labeled.

2. The method according to claim 1, wherein the classifying the to-be-processed image based on the preset neural network model comprises:
extracting a feature vector of the to-be-processed image;
determining, based on the feature vector of the to-be-processed image, confidence that the to-be-processed image belongs to each of a plurality of candidate classes; and
determining the classification result of the to-be-processed image from the plurality of candidate classes based on the confidence that the to-be-processed image belongs to each of the plurality of candidate classes.

3. The method according to claim 2, wherein the determining the classification result of the to-be-processed image from the plurality of candidate classes based on the confidence that the to-be-processed image belongs to each of the plurality of candidate classes comprises:
determining a first candidate class in the plurality of candidate classes as the classification result of the to-be-processed image, wherein the first candidate class is a class with highest confidence in the plurality of candidate classes.

4. The method according to claim 3, wherein the method further comprises:
determining a first candidate superclass in a plurality of candidate superclasses as the classification result of the to-be-processed image, wherein the confidence of the first candidate class is less than a first confidence threshold, and confidence of the first candidate superclass is greater than or equal to a second confidence threshold.

5. The method according to claim 1, wherein the classifying the to-be-processed image based on the preset neural network model comprises:
obtaining reference images of the to-be-processed image, wherein the reference images comprise a plurality of image classes, and the to-be-processed image belongs to one of the plurality of image classes;
extracting a feature vector of the to-be-processed image and a feature vector of each image class in the plurality of image classes;
determining, based on a difference between the feature vector of the to-be-processed image and the feature vector of each image class in the plurality of image classes, confidence that the to-be-processed image belongs to each image class in the plurality of image classes; and
determining the classification result of the to-be-processed image from the plurality of image classes based on the confidence that the to-be-processed image belongs to each image class in the plurality of image classes.

6. A non-transitory computer-readable storage medium, wherein the non-transitory computer-readable medium stores program code to be executed by a device, and the program code is used to perform the method according to claim 1.

7. A chip, wherein the chip comprises a processor and a data interface, and the processor reads, through the data interface, instructions stored in a memory, to perform the method according to claim 1.

8. An image classification method, comprising:
obtaining a to-be-processed image; and
classifying the to-be-processed image based on a preset first neural network model, to obtain a classification result of the to-be-processed image,
wherein the classification result of the to-be-processed image comprises a class or a superclass to which the to-be-processed image belongs,
wherein the first neural network model is obtained by performing training based on a plurality of first feature vectors, labels of a plurality of first training images, and semantic description information of the plurality of first training images, wherein the semantic description information of each first training image of the plurality of first training images is a semantic description of an image feature of the first training image; and
wherein the plurality of first feature vectors are feature vectors obtained by performing feature extraction on the plurality of first training images by a second neural network model, wherein the second neural network model is obtained by performing training based on a plurality of second training images, a label of each of the plurality of second training images, and class hierarchy information of the plurality of second training images, and wherein the class hierarchy information of the plurality of second training images comprises one or more classes to which the plurality of second training images belong and at least one superclass to which each of the plurality of second training images belongs.

9. The method according to claim 8, wherein the classifying the to-be-processed image based on the preset first neural network model comprises:
extracting a feature vector of the to-be-processed image based on the second neural network model;
processing the feature vector of the to-be-processed image based on the first neural network model, to obtain a semantic vector of the to-be-processed image; and
comparing the semantic vector of the to-be-processed image with a candidate semantic vector, to obtain the classification result of the to-be-processed image.

10. A neural network training method, comprising:
obtaining a plurality of training images;
extracting image features of the plurality of training images based on a feature extraction network of a neural network;
processing the image features of the plurality of training images based on a hierarchical prediction network of the neural network, to obtain classification results of the plurality of training images, wherein a classification result of each training image of the plurality of training images comprises a class and a superclass to which the training image belongs; and determining a parameter of a neural network model based on the classification results of the plurality of training images and labeled classes of the plurality of training images.

11. An image classification apparatus, comprising:
a memory configured to store a program; and
a processor configured to execute the program stored in the memory, wherein when the program stored in the memory is executed by the processor, the processor is configured to:
obtain a to-be-processed image; and
classify the to-be-processed image based on a preset neural network model, to obtain a classification result of the to-be-processed image,
wherein the classification result comprises a class or a superclass to which the to-be-processed image belongs,
wherein the neural network model is obtained by performing training based on a plurality of training images, a label of each training image of the plurality of training images, and class hierarchy information of the plurality of training images,
wherein the class hierarchy information of the plurality of training images comprises at least one superclass to which each of a plurality of classes belongs, and the plurality of classes comprise one or more classes to which the plurality of training images belong, and
wherein the at least one superclass to which each of the plurality of classes belongs is determined based on association degree information between word vectors corresponding to the labels of the plurality of training images.

12. The apparatus according to claim 11, wherein the classifying the to-be-processed image based on the preset neural network model comprises:
extracting a feature vector of the to-be-processed image;
determining, based on the feature vector of the to-be-processed image, confidence that the to-be-processed image belongs to each of a plurality of candidate classes; and
determining the classification result of the to-be-processed image from the plurality of candidate classes based on the confidence that the to-be-processed image belongs to each of the plurality of candidate classes.

13. The apparatus according to claim 12, wherein the determining the classification result of the to-be-processed image from the plurality of candidate classes based on the confidence that the to-be-processed image belongs to each of the plurality of candidate classes comprises:
determining a first candidate class in the plurality of candidate classes as the classification result of the to-be-processed image, wherein the first candidate class is a class with highest confidence in the plurality of candidate classes.

14. The apparatus according to claim 13, wherein the processor is further configured to:
determine a first candidate superclass in a plurality of candidate superclasses as the classification result of the to-be-processed image, wherein the confidence of the first candidate class is less than a first confidence threshold, and confidence of the first candidate superclass is greater than or equal to a second confidence threshold.

15. The apparatus according to claim 11, wherein the classifying the to-be-processed image based on the preset neural network model comprises:
obtaining reference images of the to-be-processed image, wherein the reference images comprise a plurality of image classes, and the to-be-processed image belongs to one of the plurality of image classes;
extracting a feature vector of the to-be-processed image and a feature vector of each image class in the plurality of image classes;
determining, based on a difference between the feature vector of the to-be-processed image and the feature vector of each image class in the plurality of image classes, confidence that the to-be-processed image belongs to each image class in the plurality of image classes; and
determining the classification result of the to-be-processed image from the plurality of image classes based on the confidence that the to-be-processed image belongs to each image class in the plurality of image classes.

16. An image classification apparatus, comprising:
a memory configured to store a program; and
a processor configured to execute the program stored in the memory, wherein when the program stored in the memory is executed by the processor, the processor is configured to:
obtain a to-be-processed image; and
classify the to-be-processed image based on a preset first neural network model, to obtain a classification result of the to-be-processed image,
wherein the classification result of the to-be-processed image comprises a class or a superclass to which the to-be-processed image belongs,
wherein the first neural network model is obtained by performing training based on a plurality of first feature vectors, labels of a plurality of first training images, and semantic description information of the plurality of first training images, wherein the semantic description information of each first training image of the plurality of first training images is a semantic description of an image feature of the first training image; and
wherein the plurality of first feature vectors are feature vectors obtained by performing feature extraction on the plurality of first training images by a second neural network model, wherein the second neural network model is obtained by performing training based on a plurality of second training images, a label of each of the plurality of second training images, and class hierarchy information of the plurality of second training images, and wherein the class hierarchy information of the plurality of second training images comprises one or more classes to which the plurality of second training images belong and at least one superclass to which each of the plurality of second training images belongs.

17. The apparatus according to claim 16, wherein the classifying the to-be-processed image based on the preset first neural network model comprises:
extracting a feature vector of the to-be-processed image based on the second neural network model;
processing the feature vector of the to-be-processed image based on the first neural network model, to obtain a semantic vector of the to-be-processed image; and
comparing the semantic vector of the to-be-processed image with a candidate semantic vector, to obtain the classification result of the to-be-processed image.

18. A neural network training apparatus, comprising:
a memory configured to store a program; and
a processor configured to execute the program stored in the memory, wherein when the program stored in the memory is executed by the processor, the processor is configured to:

obtain a plurality of training images;
extract image features of the plurality of training images based on a feature extraction network of a neural network;
process the image features of the plurality of training images based on a hierarchical prediction network of the neural network, to obtain classification results of the plurality of training images, wherein a classification result of each training image of the plurality of training images comprises a class and a superclass to which the training image belongs; and
determine a parameter of a neural network model based on the classification results of the plurality of training images and labeled classes of the plurality of training images.

* * * * *